US012811229B2

(12) United States Patent
Tsuda et al.

(10) Patent No.: US 12,811,229 B2
(45) **Date of Patent: *Nov. 24, 2026**

(54) ELECTRICITY STORAGE BODY

(71) Applicant: DAIKIN INDUSTRIES, LTD., Osaka (JP)

(72) Inventors: Hayato Tsuda, Osaka (JP); Tadaharu Isaka, Osaka (JP); Yumi Zenke, Osaka (JP); Yukari Yamamoto, Osaka (JP); Takahisa Aoyama, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 556 days.

This patent is subject to a terminal disclaimer.

(21) Appl. No.: 18/191,996

(22) Filed: Mar. 29, 2023

(65) Prior Publication Data

US 2023/0411751 A1 Dec. 21, 2023

Related U.S. Application Data

(63) Continuation of application No. PCT/JP2021/036306, filed on Sep. 30, 2021.

(30) Foreign Application Priority Data

Sep. 30, 2020 (JP) ................................ 2020-166536

(51) Int. Cl.
*H01M 10/00* (2006.01)
*B29C 45/00* (2006.01)
(Continued)

(52) U.S. Cl.
CPC ....... *H01M 50/193* (2021.01); *B29C 45/0001* (2013.01); *C08F 114/26* (2013.01);
(Continued)

(58) Field of Classification Search
CPC ............ H01M 50/193; H01M 50/176; H01M 50/184; H01M 50/188; H01M 50/198;
(Continued)

(56) References Cited

U.S. PATENT DOCUMENTS 3,635,926 A 1/1972 Gresham et al.
3,945,786 A 3/1976 Bishop
(Continued)

FOREIGN PATENT DOCUMENTS

CN 1527852 A 9/2004
CN 1599757 A 3/2005
(Continued)

OTHER PUBLICATIONS

Machine translation of CN103946250A, obtained Feb. 2026 (Year: 2014).*

(Continued)

*Primary Examiner* — Nicholas P D'Aniello
(74) *Attorney, Agent, or Firm* — Sughrue Mion, PLLC

(57) ABSTRACT

A power storage assembly having a gasket containing a copolymer containing tetrafluoroethylene unit and a perfluoro(propyl vinyl ether) unit, wherein the copolymer has a content of the perfluoro(propyl vinyl ether) unit of 2.0 to 4.5% by mass with respect to the whole of the monomer units, a melt flow rate of 5 to 36 g/10 min, and the number of functional groups of —CF=$CF_2$, —$CF_2$H, —COF, —COOH, —$COOCH_3$, —$CONH_2$ and —$CH_2$OH of more than 50 per $10^6$ main-chain carbon atoms, wherein the gasket has a thickness of 0.5 to 2.5 mm.

7 Claims, 5 Drawing Sheets

(51) Int. Cl.

| | |
|---|---|
| ***C08F 114/26*** | (2006.01) |
| ***C08F 214/26*** | (2006.01) |
| ***C08L 27/18*** | (2006.01) |
| ***C09D 127/18*** | (2006.01) |
| ***C09D 127/20*** | (2006.01) |
| ***C09K 3/10*** | (2006.01) |
| ***H01B 3/44*** | (2006.01) |
| ***H01G 11/80*** | (2013.01) |
| ***H01M 50/176*** | (2021.01) |
| ***H01M 50/184*** | (2021.01) |
| ***H01M 50/188*** | (2021.01) |
| ***H01M 50/193*** | (2021.01) |
| ***H01M 50/198*** | (2021.01) |
| *B29K 27/18* | (2006.01) |

(52) U.S. Cl.

CPC .......... *C08F 214/262* (2013.01); *C08L 27/18* (2013.01); *C09D 127/18* (2013.01); *C09D 127/20* (2013.01); *C09K 3/1009* (2013.01); *H01B 3/445* (2013.01); *H01G 11/80* (2013.01); *H01M 50/176* (2021.01); *H01M 50/184* (2021.01); *H01M 50/188* (2021.01); *H01M 50/198* (2021.01); *B29K 2027/18* (2013.01); *C08L 2205/025* (2013.01)

(58) Field of Classification Search

CPC ............... B29C 45/0001; C08F 114/26; C08F 214/262; C08L 27/18; C08L 2205/025; C09D 127/18; C09D 127/20; C09K 3/1009; H01B 3/445; H01G 11/80; B29K 2027/18

See application file for complete search history.

(56) References Cited

U.S. PATENT DOCUMENTS

| | | | | |
|---|---|---|---|---|
| 4,029,868 | A | 6/1977 | Carlson | |
| 4,262,101 | A | 4/1981 | Hartwimmer et al. | |
| 4,414,356 | A | 11/1983 | Michel | |
| 4,510,300 | A | 4/1985 | Levy | |
| 4,743,658 | A | 5/1988 | Imbalzano et al. | |
| 4,902,444 | A | 2/1990 | Kolouch | |
| 4,999,221 | A | 3/1991 | Eigenbrod et al. | |
| 5,000,875 | A | 3/1991 | Kolouch | |
| 5,656,392 | A | 8/1997 | Sano et al. | |
| 5,703,185 | A | 12/1997 | Blair | |
| 5,767,198 | A | 6/1998 | Shimizu et al. | |
| 5,851,693 | A | 12/1998 | Sano et al. | |
| 6,066,707 | A | 5/2000 | Colaianna et al. | |
| 6,069,215 | A | 5/2000 | Araki et al. | |
| 6,096,795 | A | 8/2000 | Abusleme et al. | |
| 6,689,833 | B1 | 2/2004 | Bidstrup et al. | |
| 6,713,183 | B2 | 3/2004 | Araki et al. | |
| 6,740,375 | B1 | 5/2004 | Sagisaka et al. | |
| 6,774,196 | B1 | 8/2004 | Taira et al. | |
| 8,143,351 | B2 | 3/2012 | Shiotsuki et al. | |
| 9,963,564 | B2 | 5/2018 | Imamura et al. | |
| 11,826,975 | B2 | 11/2023 | Imamura et al. | |
| 2002/0011692 | A1 | 1/2002 | Lahijani | |
| 2002/0099143 | A1 | 7/2002 | Namura | |
| 2002/0167115 | A1 | 11/2002 | Tanaka | |
| 2003/0013791 | A1 | 1/2003 | Blong et al. | |
| 2003/0109646 | A1 | 6/2003 | Kubo et al. | |
| 2003/0114615 | A1 | 6/2003 | Sumi et al. | |
| 2003/0190530 | A1 | 10/2003 | Yang et al. | |
| 2003/0216531 | A1 | 11/2003 | Aten et al. | |
| 2004/0072935 | A1 | 4/2004 | Blong et al. | |
| 2004/0102572 | A1 | 5/2004 | Kubo et al. | |
| 2004/0204536 | A1 | 10/2004 | Miyatani et al. | |
| 2004/0260044 | A1 | 12/2004 | Earnest, Jr. et al. | |
| 2005/0020792 | A1 | 1/2005 | Aoyama et al. | |
| 2005/0245626 | A1 | 11/2005 | Hoaglund et al. | |
| 2007/0112155 | A1 | 5/2007 | Takase et al. | |
| 2007/0149734 | A1 | 6/2007 | Sakakibara et al. | |
| 2007/0281166 | A1 | 12/2007 | Nishio | |
| 2007/0292685 | A1 | 12/2007 | Brothers et al. | |
| 2008/0038627 | A1 | 2/2008 | Yamauchi et al. | |
| 2008/0114143 | A1 | 5/2008 | Brothers et al. | |
| 2008/0241534 | A1 | 10/2008 | Ohtani et al. | |
| 2009/0038821 | A1 | 2/2009 | Sato et al. | |
| 2009/0044965 | A1 | 2/2009 | Kono et al. | |
| 2009/0176952 | A1 | 7/2009 | Funaki et al. | |
| 2009/0246435 | A1 | 10/2009 | Shimono et al. | |
| 2010/0063214 | A1 | 3/2010 | Kasahara et al. | |
| 2010/0212929 | A1 | 8/2010 | Ishii et al. | |
| 2010/0273047 | A1 | 10/2010 | Kunoike et al. | |
| 2010/0314153 | A1 | 12/2010 | Ishii et al. | |
| 2010/0314154 | A1 | 12/2010 | Kitahara et al. | |
| 2011/0052970 | A1 | 3/2011 | Kurata et al. | |
| 2011/0052977 | A1 | 3/2011 | Kurata et al. | |
| 2011/0104562 | A1 | 5/2011 | Byun et al. | |
| 2011/0203830 | A1 | 8/2011 | Kono et al. | |
| 2011/0272173 | A1 | 11/2011 | Shiotsuki et al. | |
| 2012/0035329 | A1 | 2/2012 | Isogai et al. | |
| 2012/0064273 | A1 | 3/2012 | Bacino | |
| 2012/0094169 | A1 | 4/2012 | Kim et al. | |
| 2013/0046058 | A1 | 2/2013 | Pham et al. | |
| 2013/0130100 | A1 | 5/2013 | Kurata et al. | |
| 2014/0227533 | A1 | 8/2014 | Murakami et al. | |
| 2014/0287177 | A1 | 9/2014 | Suda et al. | |
| 2014/0378616 | A1 | 12/2014 | Nakano et al. | |
| 2015/0041145 | A1 | 2/2015 | Colaianna et al. | |
| 2015/0148481 | A1 | 5/2015 | Brothers et al. | |
| 2015/0158988 | A1 | 6/2015 | Sawaki et al. | |
| 2015/0322187 | A1 | 11/2015 | Miele et al. | |
| 2015/0353700 | A1 | 12/2015 | Isaka et al. | |
| 2016/0006004 | A1 | 1/2016 | Ogawa et al. | |
| 2016/0078979 | A1 | 3/2016 | Hosoda et al. | |
| 2016/0108159 | A1 | 4/2016 | Sekiguchi et al. | |
| 2016/0194491 | A1 | 7/2016 | Taguchi et al. | |
| 2016/0272805 | A1 | 9/2016 | Nakanishi et al. | |
| 2016/0319089 | A1 | 11/2016 | Imamura et al. | |
| 2016/0322128 | A1 | 11/2016 | Imamura et al. | |
| 2016/0340455 | A1 | 11/2016 | Abe et al. | |
| 2017/0008986 | A1 | 1/2017 | Isaka et al. | |
| 2017/0025204 | A1 | 1/2017 | Chapman et al. | |
| 2017/0154707 | A1 | 6/2017 | Abe et al. | |
| 2017/0214037 | A1 | 7/2017 | Uematsu et al. | |
| 2017/0260344 | A1 | 9/2017 | Imamura et al. | |
| 2018/0009204 | A1 | 1/2018 | Higuchi et al. | |
| 2018/0036931 | A1 | 2/2018 | Higuchi et al. | |
| 2018/0237566 | A1 | 8/2018 | Aida et al. | |
| 2018/0265654 | A1 | 9/2018 | Imamura et al. | |
| 2018/0283590 | A1 | 10/2018 | Yokoyama et al. | |
| 2019/0134939 | A1 | 5/2019 | Colaianna et al. | |
| 2019/0143628 | A1 | 5/2019 | Colaianna et al. | |
| 2019/0177453 | A1 | 6/2019 | Isaka et al. | |
| 2019/0193315 | A1 | 6/2019 | Miyamoto et al. | |
| 2019/0273240 | A1* | 9/2019 | Hagino .............. | B23K 20/2333 |
| 2019/0375929 | A1 | 12/2019 | Nishimura et al. | |
| 2019/0382544 | A1 | 12/2019 | Yokotani et al. | |
| 2020/0332037 | A1 | 10/2020 | Isaka et al. | |
| 2021/0008827 | A1 | 1/2021 | Colaianna et al. | |
| 2021/0008828 | A1 | 1/2021 | Colaianna et al. | |
| 2021/0024709 | A1 | 1/2021 | Fukushima et al. | |
| 2021/0024769 | A1 | 1/2021 | Imamura et al. | |
| 2021/0189031 | A1 | 6/2021 | Hintzer et al. | |
| 2021/0246237 | A1 | 8/2021 | Isaka et al. | |
| 2021/0269568 | A1 | 9/2021 | Imamura et al. | |
| 2022/0001657 | A1 | 1/2022 | Kikuchi et al. | |
| 2022/0033636 | A1 | 2/2022 | Nishimura et al. | |
| 2022/0170573 | A1 | 6/2022 | Imamura et al. | |
| 2022/0181689 | A1 | 6/2022 | Isaka et al. | |
| 2022/0181698 | A1 | 6/2022 | Isaka et al. | |
| 2022/0181729 | A1 | 6/2022 | Isaka et al. | |
| 2022/0195088 | A1 | 6/2022 | Imamura et al. | |
| 2022/0213996 | A1 | 7/2022 | Imamura et al. | |
| 2022/0266485 | A1 | 8/2022 | Tsuda et al. | |
| 2022/0278403 | A1 | 9/2022 | Tsuda et al. | |
| 2023/0227594 | A1 | 7/2023 | Yamamoto et al. | |
| 2023/0235107 | A1 | 7/2023 | Isaka et al. | |

(56) References Cited

U.S. PATENT DOCUMENTS

| | | | |
|---|---|---|---|
| 2023/0235159 | A1 | 7/2023 | Isaka et al. |
| 2023/0235160 | A1 | 7/2023 | Isaka et al. |
| 2023/0238627 | A1 | 7/2023 | Isaka et al. |
| 2023/0238628 | A1 | 7/2023 | Zenke et al. |
| 2023/0238629 | A1 | 7/2023 | Isaka et al. |
| 2023/0272136 | A1 | 8/2023 | Zenke et al. |
| 2023/0295356 | A1 | 9/2023 | Isaka et al. |
| 2023/0344077 | A1 | 10/2023 | Qiu et al. |
| 2023/0383031 | A1 | 11/2023 | Isaka et al. |
| 2023/0383032 | A1 | 11/2023 | Isaka et al. |
| 2023/0383033 | A1 | 11/2023 | Zenke et al. |
| 2023/0383034 | A1 | 11/2023 | Isaka et al. |
| 2023/0390977 | A1 | 12/2023 | Hamada et al. |
| 2023/0390978 | A1 | 12/2023 | Tsuda et al. |
| 2023/0390979 | A1 | 12/2023 | Tsuda et al. |
| 2023/0390980 | A1 | 12/2023 | Tsuda et al. |
| 2023/0390981 | A1 | 12/2023 | Tsuda et al. |
| 2023/0391909 | A1 | 12/2023 | Isaka et al. |
| 2023/0391910 | A1 | 12/2023 | Isaka et al. |
| 2023/0391911 | A1 | 12/2023 | Isaka et al. |
| 2023/0391912 | A1 | 12/2023 | Isaka et al. |
| 2023/0391917 | A1 | 12/2023 | Isaka et al. |
| 2023/0391920 | A1 | 12/2023 | Isaka et al. |
| 2023/0391927 | A1 | 12/2023 | Isaka |
| 2023/0391929 | A1 | 12/2023 | Isaka et al. |
| 2023/0391931 | A1 | 12/2023 | Isaka et al. |
| 2023/0391932 | A1 | 12/2023 | Isaka et al. |
| 2023/0391933 | A1 | 12/2023 | Isaka et al. |
| 2023/0392737 | A1 | 12/2023 | Tsuda et al. |
| 2023/0395282 | A1 | 12/2023 | Isaka et al. |
| 2023/0399431 | A1 | 12/2023 | Isaka et al. |
| 2023/0399432 | A1 | 12/2023 | Isaka et al. |
| 2023/0399438 | A1 | 12/2023 | Isaka et al. |
| 2023/0399441 | A1 | 12/2023 | Isaka et al. |
| 2023/0399443 | A1 | 12/2023 | Isaka et al. |
| 2023/0406975 | A1 | 12/2023 | Isaka et al. |
| 2023/0406976 | A1 | 12/2023 | Isaka et al. |
| 2023/0411751 | A1 | 12/2023 | Tsuda et al. |
| 2023/0415387 | A1 | 12/2023 | Hamada et al. |
| 2025/0002728 | A1 | 1/2025 | Zenke et al. |
| 2025/0011488 | A1 | 1/2025 | Isaka et al. |
| 2025/0011490 | A1 | 1/2025 | Isaka et al. |
| 2025/0011494 | A1 | 1/2025 | Isaka et al. |
| 2025/0011496 | A1 | 1/2025 | Yamamoto et al. |
| 2025/0011498 | A1 | 1/2025 | Isaka et al. |
| 2025/0011499 | A1 | 1/2025 | Isaka et al. |
| 2025/0011500 | A1 | 1/2025 | Isaka et al. |
| 2025/0019476 | A1 | 1/2025 | Isaka et al. |
| 2025/0034302 | A1 | 1/2025 | Isaka et al. |

FOREIGN PATENT DOCUMENTS

| | | | | |
|---|---|---|---|---|
| CN | 101364456 | A | 2/2009 | |
| CN | 103946250 | A | * 7/2014 | .......... H01M 50/193 |
| CN | 107428144 | A | 12/2017 | |
| CN | 109476061 | A | 3/2019 | |
| CN | 110712348 | A | 1/2020 | |
| CN | 110790854 | A | 2/2020 | |
| CN | 114223086 | A | 3/2022 | |
| CN | 114258609 | A | 3/2022 | |
| CN | 116390957 | A | 7/2023 | |
| CN | 116867821 | A | 10/2023 | |
| CN | 116917346 | A | 10/2023 | |
| EP | 0 220 910 | A2 | 5/1987 | |
| EP | 0 423 995 | A1 | 4/1991 | |
| EP | 0 976 544 | A1 | 2/2000 | |
| EP | 1 260 526 | A1 | 11/2002 | |
| EP | 1 462 458 | A1 | 9/2004 | |
| EP | 3 816 214 | A1 | 5/2021 | |
| EP | 4 024 550 | A1 | 7/2022 | |
| EP | 4 024 575 | A1 | 7/2022 | |
| EP | 4 223 793 | A1 | 8/2023 | |
| EP | 4 223 794 | A1 | 8/2023 | |
| GB | 1210794 | A | 10/1970 | |
| JP | 48-20788 | B1 | 6/1973 | |
| JP | 58-132512 | A | 8/1983 | |
| JP | 58-191127 | A | 11/1983 | |
| JP | 59-120433 | A | 7/1984 | |
| JP | 62-104822 | A | 5/1987 | |
| JP | 62-53019 | B2 | 11/1987 | |
| JP | 1-53167 | B2 | 11/1989 | |
| JP | 2-129253 | A | 5/1990 | |
| JP | 3-184209 | A | 8/1991 | |
| JP | 3-247609 | A | 11/1991 | |
| JP | 4-357398 | A | 12/1992 | |
| JP | 6-1902 | A | 1/1994 | |
| JP | 6-40813 | B2 | 6/1994 | |
| JP | 6-287405 | A | 10/1994 | |
| JP | 7-16869 | A | 1/1995 | |
| JP | 7-112449 | A | 5/1995 | |
| JP | 7-188337 | A | 7/1995 | |
| JP | 7-290496 | A | 11/1995 | |
| JP | 8-207106 | A | 8/1996 | |
| JP | 8-321287 | A | 12/1996 | |
| JP | 9-245832 | A | 9/1997 | |
| JP | 10-87746 | A | 4/1998 | |
| JP | 10-158456 | A | 6/1998 | |
| JP | 10-275604 | A | 10/1998 | |
| JP | 10-292054 | A | 11/1998 | |
| JP | 2001-151825 | A | 6/2001 | |
| JP | 2001-151826 | A | 6/2001 | |
| JP | 2001-283907 | A | 10/2001 | |
| JP | 2001-283921 | A | 10/2001 | |
| JP | 2002-53620 | A | 2/2002 | |
| JP | 2002-63934 | A | 2/2002 | |
| JP | 2002-167488 | A | 6/2002 | |
| JP | 2003-327770 | A | 11/2003 | |
| JP | 2003-534940 | A | 11/2003 | |
| JP | 2004-256406 | A | 9/2004 | |
| JP | 2004-534131 | A | 11/2004 | |
| JP | 2005-523979 | A | 8/2005 | |
| JP | 2005-298659 | A | 10/2005 | |
| JP | 2005-320497 | A | 11/2005 | |
| JP | 2006-117912 | A | 5/2006 | |
| JP | 2006-312736 | A | 11/2006 | |
| JP | 2007-238960 | A | 9/2007 | |
| JP | 2008-66254 | A | 3/2008 | |
| JP | 2009-42478 | A | 2/2009 | |
| JP | 2009-59690 | A | 3/2009 | |
| JP | 2009-235564 | A | 10/2009 | |
| JP | 2009-272207 | A | 11/2009 | |
| JP | 2010-56079 | A | 3/2010 | |
| JP | 2010-509443 | A | 3/2010 | |
| JP | 2010-85741 | A | 4/2010 | |
| JP | 2010-162817 | A | 7/2010 | |
| JP | 2010-235667 | A | 10/2010 | |
| JP | 2011-48976 | A | 3/2011 | |
| JP | 2011-71104 | A | 4/2011 | |
| JP | 2012-54269 | A | 3/2012 | |
| JP | 2012-80911 | A | 4/2012 | |
| JP | 2012-106494 | A | 6/2012 | |
| JP | 2012-130557 | A | 7/2012 | |
| JP | 2013-71341 | A | 4/2013 | |
| JP | 2013-82888 | A | 5/2013 | |
| JP | 2013-177574 | A | 9/2013 | |
| JP | 2014-28951 | A | 2/2014 | |
| JP | 2014-59052 | A | 4/2014 | |
| JP | 2014-187040 | A | 10/2014 | |
| JP | 2015-7218 | A | 1/2015 | |
| JP | 2015-519410 | A | 7/2015 | |
| JP | 2015-147924 | A | 8/2015 | |
| JP | 2015-168840 | A | 9/2015 | |
| JP | 2016-537499 | A | 12/2016 | |
| JP | 2017-197690 | A | 11/2017 | |
| JP | 2018-20468 | A | 2/2018 | |
| JP | 2018-514598 | A | 6/2018 | |
| JP | 2018-523272 | A | 8/2018 | |
| JP | 2018-159090 | A | 10/2018 | |
| JP | 2019-172962 | A | 10/2019 | |
| JP | 2019-210420 | A | 12/2019 | |
| JP | 2019-214641 | A | 12/2019 | |
| JP | 2020-2341 | A | 1/2020 | |
| JP | 2020-15906 | A | 1/2020 | |
| JP | 2020-29042 | A | 2/2020 | |

(56) References Cited

FOREIGN PATENT DOCUMENTS

| | | | |
|---|---|---|---|
| JP | 2020-100823 | A | 7/2020 |
| JP | 2020-100843 | A | 7/2020 |
| JP | 2021-6648 | A | 1/2021 |
| JP | 2021-141043 | A | 9/2021 |
| JP | 2021-141045 | A | 9/2021 |
| JP | 2022-19196 | A | 1/2022 |
| KR | 10-2004-0071160 | A | 8/2004 |
| KR | 10-2013-0069652 | A1 | 6/2013 |
| KR | 10-2019-0034205 | A | 4/2019 |
| WO | 95/29956 | A1 | 11/1995 |
| WO | 01/40331 | A1 | 6/2001 |
| WO | 03/006566 | A1 | 1/2003 |
| WO | 03/048214 | A1 | 6/2003 |
| WO | 2004/052987 | A1 | 6/2004 |
| WO | 2008/032613 | A1 | 3/2008 |
| WO | 2008/047759 | A1 | 4/2008 |
| WO | 2008/047906 | A1 | 4/2008 |
| WO | 2008/143069 | A1 | 11/2008 |
| WO | 2010/113864 | A1 | 10/2010 |
| WO | 2013/115374 | A1 | 8/2013 |
| WO | 2014/007346 | A1 | 1/2014 |
| WO | 2014/129413 | A1 | 8/2014 |
| WO | 2015/119053 | A1 | 8/2015 |
| WO | 2016/117492 | A1 | 7/2016 |
| WO | 2017/056203 | A1 | 4/2017 |
| WO | 2017/082417 | A1 | 5/2017 |
| WO | 2019/003265 | A1 | 1/2019 |
| WO | 2019/187725 | A1 | 10/2019 |
| WO | 2019/189316 | A1 | 10/2019 |
| WO | 2019/208492 | A1 | 10/2019 |
| WO | 2020/004083 | A1 | 1/2020 |
| WO | 2020/090981 | A1 | 5/2020 |
| WO | 2020/130144 | A1 | 6/2020 |
| WO | 2020/204163 | A1 | 10/2020 |
| WO | 2021/033539 | A1 | 2/2021 |
| WO | 2021/039862 | A1 | 3/2021 |
| WO | 2021/039863 | A1 | 3/2021 |
| WO | 2021/039865 | A1 | 3/2021 |
| WO | 2021039861 | A1 | 3/2021 |
| WO | 2021039864 | A1 | 3/2021 |
| WO | 2021/059753 | A1 | 4/2021 |
| WO | 2022/181225 | A1 | 9/2022 |
| WO | 2022/181231 | A1 | 9/2022 |
| WO | 2022/181232 | A1 | 9/2022 |

OTHER PUBLICATIONS

European Search Report issued Dec. 4, 2024 for European Patent Application No. 22759287.0.
European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al., "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).
International Preliminary Report on Patentability, with Translation of Written Opinion issued Mar. 28, 2023 in International Application No. PCT/JP2021/036301.
International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.
International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.
International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.

(56) References Cited

OTHER PUBLICATIONS

Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
International Search Report dated Jun. 20, 2023 in International Application No. PCT/JP2023/013284.
International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.
International Search Report dated Jun. 6, 2023 for International Application No. PCT/JP2023/013291.
International Search Report dated Jun. 6, 2023 for International Application No. PCT/JP2023/013292.
International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.
International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.
International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.
International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
U.S. Appl. No. 17/679,789, filed Feb. 24, 2022, Isaka, et al., cont of PCT/JP2020/032238.
U.S. Appl. No. 17/679,831, filed Feb. 24, 2022, Isaka, et al., cont of PCT/JP2020/032239.
U.S. Appl. No. 17/679,818, filed Feb. 24, 2022, Isaka, et al., cont of PCT/JP2020/032236.
U.S. Appl. No. 17/679,765, filed Feb. 24, 2022, Isaka, et al., cont of PCT/JP2020/032237.
U.S. Appl. No. 17/680,911, filed Feb. 25, 2022, Tsuda, et al., cont of PCT/JP2020/032234.
U.S. Appl. No. 18/191,412, filed Mar. 28, 2023, Isaka, et al., cont of PCT/JP2021/036301.
U.S. Appl. No. 18/191,461, filed Mar. 28, 2023, Zenke, et al., cont of PCT/JP2021/036302.
U.S. Appl. No. 18/192,020, filed Mar. 29, 2023, Isaka, et al., cont of PCT/JP2021/036303.
U.S. Appl. No. 18/192,053, filed Mar. 29, 2023, Isaka, et al., cont of PCT/JP2021/036304.
U.S. Appl. No. 18/192,101, filed Mar. 29, 2023, Yamamoto, et al., cont of PCT/JP2021/036305.
U.S. Appl. No. 18/192,052, filed Mar. 29, 2023, Zenke, et al., cont of PCT/JP2021/036307.
U.S. Appl. No. 18/192,011, filed Mar. 29, 2023, Isaka, et al., cont of PCT/JP2021/036308.
U.S. Appl. No. 18/192,077, filed Mar. 29, 2023, Isaka, et al., cont of PCT/JP2021/036309.
U.S. Appl. No. 18/192,298, filed Mar. 29, 2023, Isaka, et al., cont of PCT/JP2021/036310.
U.S. Appl. No. 18/453,775, filed Aug. 22, 2023, Tsuda, et al., cont of PCT/JP2022/007735.
U.S. Appl. No. 18/453,690, filed Aug. 22, 2023, Tsuda, et al., cont of PCT/JP2022/007737.
U.S. Appl. No. 18/452,806, filed Aug. 21, 2023, Tsuda, et al., cont of PCT/JP2022/007738.
U.S. Appl. No. 18/450,642, filed Aug. 16, 2023, Isaka, et al., cont of PCT/JP2022/003634.
U.S. Appl. No. 18/448,291, filed Aug. 11, 2023, Isaka, et al., cont of PCT/JP2022/003635.
U.S. Appl. No. 18/449,061, filed Aug. 14, 2023, Isaka, et al., cont of PCT/JP2022/003636.
U.S. Appl. No. 18/448,234, filed Aug. 11, 2023, Isaka, et al., cont of PCT/JP2022/003637.
U.S. Appl. No. 18/453,363, filed Aug. 22, 2023, Isaka, et al., cont of PCT/JP2022/003638.
U.S. Appl. No. 18/449,788, filed Aug. 15, 2023, Isaka, et al., cont of PCT/JP2022/003640.
U.S. Appl. No. 18/451,502, filed Aug. 17, 2023, Isaka, et al., cont of PCT/JP2022/003641.
U.S. Appl. No. 18/450,590, filed Aug. 16, 2023, Tsuda, et al., cont of PCT/JP2022/003642.
U.S. Appl. No. 18/450,094, filed Aug. 15, 2023, Hamada, et al., cont of PCT/JP2022/003643.
U.S. Appl. No. 18/449,845, filed Aug. 15, 2023, Zenke, et al., cont of PCT/JP2022/003644.
U.S. Appl. No. 18/446,746, filed Aug. 9, 2023, Isaka, et al., cont of PCT/JP2022/003645.
U.S. Appl. No. 18/450,491, filed Aug. 16, 2023, Isaka, et al., cont of PCT/JP2022/003646.
U.S. Appl. No. 18/451,525, filed Aug. 17, 2023, Isaka, et al., cont of PCT/JP2022/003647.

(56) References Cited

OTHER PUBLICATIONS

U.S. Appl. No. 18/451,455, filed Aug. 17, 2023, Isaka, et al., cont of PCT/JP2022/003468.
U.S. Appl. No. 18/452,107, filed Aug. 18, 2023, Isaka, et al., cont of PCT/JP2022/003649.
U.S. Appl. No. 18/452,146, filed Aug. 18, 2023, Isaka, et al., cont of PCT/JP2022/003650.
U.S. Appl. No. 18/448,341, filed Aug. 11, 2023, Isaka, et al., cont of PCT/JP2022/003651.
U.S. Appl. No. 18/449,778, filed Aug. 15, 2023, Isaka, et al., cont of PCT/JP2022/003652.
U.S. Appl. No. 18/447,877, filed Aug. 10, 2023, Isaka, et al., cont of PCT/JP2022/003653.
U.S. Appl. No. 18/452,908, filed Aug. 21, 2023, Isaka, et al., cont of PCT/JP2022/003654.
U.S. Appl. No. 18/454,141, filed Aug. 23, 2023, Isaka, et al., cont of PCT/JP2022/003657.
U.S. Appl. No. 18/453,709, filed Aug. 22, 2023, Isaka, et al., cont of PCT/JP2022/003658.
U.S. Appl. No. 18/452,769, filed Aug. 21, 2023, Isaka, et al., cont of PCT/JP2022/003659.
U.S. Appl. No. 18/453,810, filed Aug. 22, 2023, Tsuda, et al., cont of PCT/JP2022/003660.
U.S. Appl. No. 18/450,568, filed Aug. 16, 2023, Hamada, et al., cont of PCT/JP2022/003661.
U.S. Appl. No. 18/453,683, filed Aug. 22, 2023, Isaka, et al., cont of PCT/JP2022/003664.
U.S. Appl. No. 18/454,133, filed Aug. 23, 2023, Isaka, et al., cont of PCT/JP2022/003665.
Extended European Search Report issued Aug. 2, 2023 in European Application No. 20857704.9.
International Preliminary Report on Patentability dated Aug. 29, 2023 with a Translation of the Written Opinion of the International Searching Authority in Application No. PCT/JP2022/003634.
International Preliminary Report on Patentability dated Aug. 29, 2023 with a Translation of the Written Opinion of the International Searching Authority in Application No. PCT/JP2022/003635.
International Preliminary Report on Patentability dated Aug. 29, 2023 with a Translation of the Written Opinion of the International Searching Authority in Application No. PCT/JP2022/003636.
International Preliminary Report on Patentability dated Aug. 29, 2023 with a Translation of the Written Opinion of the International Searching Authority in Application No. PCT/JP2022/003637.
International Preliminary Report on Patentability dated Aug. 29, 2023 with a Translation of the Written Opinion of the International Searching Authority in Application No. PCT/JP2022/003638.
International Preliminary Report on Patentability dated Aug. 29, 2023 with a Translation of the Written Opinion of the International Searching Authority in Application No. PCT/JP2022/003640.
International Preliminary Report on Patentability dated Aug. 29, 2023 with a Translation of the Written Opinion of the International Searching Authority in Application No. PCT/JP2022/003641.
International Preliminary Report on Patentability dated Aug. 29, 2023 with a Translation of the Written Opinion of the International Searching Authority in Application No. PCT/JP2022/003642.
International Preliminary Report on Patentability dated Aug. 29, 2023 with a Translation of the Written Opinion of the International Searching Authority in Application No. PCT/JP2022/003643.
International Preliminary Report on Patentability dated Aug. 29, 2023 with a Translation of the Written Opinion of the International Searching Authority in Application No. PCT/JP2022/003644.
International Preliminary Report on Patentability dated Aug. 29, 2023 with a Translation of the Written Opinion of the International Searching Authority in Application No. PCT/JP2022/003645.
International Preliminary Report on Patentability dated Aug. 29, 2023 with a Translation of the Written Opinion of the International Searching Authority in Application No. PCT/JP2022/003646.
International Preliminary Report on Patentability dated Aug. 29, 2023 with a Translation of the Written Opinion of the International Searching Authority in Application No. PCT/JP2022/003647.
International Preliminary Report on Patentability dated Aug. 29, 2023 with a Translation of the Written Opinion of the International Searching Authority in Application No. PCT/JP2022/003648.
International Preliminary Report on Patentability dated Aug. 29, 2023 with a Translation of the Written Opinion of the International Searching Authority in Application No. PCT/JP2022/003649.
International Preliminary Report on Patentability dated Aug. 29, 2023 with a Translation of the Written Opinion of the International Searching Authority in Application No. PCT/JP2022/003650.
International Preliminary Report on Patentability dated Aug. 29, 2023 with a Translation of the Written Opinion of the International Searching Authority in Application No. PCT/JP2022/003651.
International Preliminary Report on Patentability dated Aug. 29, 2023 with a Translation of the Written Opinion of the International Searching Authority in Application No. PCT/JP2022/003652.
International Preliminary Report on Patentability dated Aug. 29, 2023 with a Translation of the Written Opinion of the International Searching Authority in Application No. PCT/JP2022/003653.
International Preliminary Report on Patentability dated Aug. 29, 2023 with a Translation of the Written Opinion of the International Searching Authority in Application No. PCT/JP2022/003654.
International Preliminary Report on Patentability dated Aug. 29, 2023 with a Translation of the Written Opinion of the International Searching Authority in Application No. PCT/JP2022/003657.
International Preliminary Report on Patentability dated Aug. 29, 2023 with a Translation of the Written Opinion of the International Searching Authority in Application No. PCT/JP2022/003658.
International Preliminary Report on Patentability dated Aug. 29, 2023 with a Translation of the Written Opinion of the International Searching Authority in Application No. PCT/JP2022/003659.
International Preliminary Report on Patentability dated Aug. 29, 2023 with a Translation of the Written Opinion of the International Searching Authority in Application No. PCT/JP2022/003660.
International Preliminary Report on Patentability dated Aug. 29, 2023 with a Translation of the Written Opinion of the International Searching Authority in Application No. PCT/JP2022/003661.
International Preliminary Report on Patentability dated Aug. 29, 2023 with a Translation of the Written Opinion of the International Searching Authority in Application No. PCT/JP2022/003664.
International Preliminary Report on Patentability dated Aug. 29, 2023 with a Translation of the Written Opinion of the International Searching Authority in Application No. PCT/JP2022/003665.
International Preliminary Report on Patentability dated Aug. 29, 2023 with a Translation of the Written Opinion of the International Searching Authority in Application No. PCT/JP2022/007735.
International Preliminary Report on Patentability dated Aug. 29, 2023 with a Translation of the Written Opinion of the International Searching Authority in Application No. PCT/JP2022/007737.
International Preliminary Report on Patentability dated Aug. 29, 2023 with a Translation of the Written Opinion of the International Searching Authority in Application No. PCT/JP2022/007738.
European Search Report issued Feb. 10, 2025 for European Patent Application No. 22759283.9.
European Search Report issued Feb. 20, 2025 for European Patent Application No. 22759263.1.
International Search Report issued Oct. 13, 2020 in International Application No. PCT/JP2020/032236.
International Search Report issued Oct. 13, 2020 in International Application No. PCT/JP2020/032237.
International Search Report issued Oct. 13, 2020 in International Application No. PCT/JP2020/032238.
International Search Report issued Oct. 13, 2020 in International Application No. PCT/JP2020/032239.
International Search Report dated Oct. 6, 2020 in International Application No. PCT/JP2020/032234.
International Preliminary Report on Patentability with Written Opinion dated Mar. 1, 2022 in International Application No. PCT/JP2020/032238.
International Preliminary Report on Patentability with Written Opinion dated Mar. 1, 2022 in International Application No. PCT/JP2020/032239.

(56) References Cited

OTHER PUBLICATIONS

International Preliminary Report on Patentability with Written Opinion dated Mar. 1, 2022 in International Application No. PCT/JP2020/032236.
International Preliminary Report on Patentability, with Translation of Written Opinion issued Mar. 1, 2022 in International Application No. PCT/JP2020/032237.
International Preliminary Report on Patentability with Written Opinion dated Mar. 1, 2022 in International Application No. PCT/JP2020/032234.
Translation of the International Search Report dated Dec. 21, 2021 in International Application No. PCT/JP2021/036301.
Translation of the International Search Report dated Dec. 21, 2021 in International Application No. PCT/JP2021/036302.
Translation of the International Search Report dated Dec. 21, 2021 in International Application No. PCT/JP2021/036303.
Translation of the International Search Report dated Nov. 9, 2021 in International Application No. PCT/JP2021/036304.
Translation of the International Search Report dated Apr. 12, 2022 in International Application No. PCT/JP2022/003643.
Translation of the International Search Report dated Nov. 9, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.
Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.
Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
Extended European Search Report dated Mar. 11, 2026 in application No. 23 780 928.0.
Extended European Search Report dated Mar. 11, 2026 in application No. 23 780 929.8.
Extended European Search Report dated Mar. 11, 2026 in application No. 23 780 936.3.
Extended European Search Report dated Mar. 11, 2026 in application No. 23 780 953.8.
Extended European Search Report dated Mar. 11, 2026 in application No. 23 780 954.6.
Extended European Search Report dated Mar. 11, 2026 in application No. 23 780 955.3.
Extended European Search Report dated Mar. 11, 2026 in application No. 23 780 932.2.
Extended European Search Report dated Mar. 11, 2026 in application No. 23 780 933.0.
Extended European Search Report dated Mar. 11, 2026 in application No. 23 780 934.8.

* cited by examiner

ELECTRICITY STORAGE BODY

CROSS-REFERENCE TO RELATED APPLICATIONS

This application is a Rule 53(b) Continuation of International Application No. PCT/JP2021/036306 filed Sep. 30, 2021, which claims priority based on Japanese Patent Application No. 2020-166536 filed Sep. 30, 2020, the respective disclosures of which are incorporated herein by reference in their entirety.

TECHNICAL FIELD

The present disclosure relates to a power storage assembly.

BACKGROUND ART

Power storage assemblies such as non-aqueous electrolyte secondary batteries are mounted broadly on electronic and electric devices.

In Patent Document 1, there is proposed a flat non-aqueous electrolyte secondary battery in which a positive electrode, a negative electrode, a separator and a non-aqueous electrolyte are housed in a battery container composed of a battery case, a sealing plate and a gasket, wherein the material of the gasket is composed of a tetrafluoroethylene perfluoroalkyl vinyl ether copolymer (PFA resin) in which the fluorine content is 70% by mol or higher and 85% by mol or lower, and the melt flow rate (MFR) is 20 g/10 min or higher and 45 g/10 min or lower.

RELATED ART

Patent Document

Patent Document 1: Japanese Patent Laid-Open No. 2010-056079

SUMMARY

According to the present disclosure, there is provided a power storage assembly comprising a gasket containing a copolymer containing tetrafluoroethylene unit and a perfluoro(propyl vinyl ether) unit, wherein the copolymer has a content of the perfluoro(propyl vinyl ether) unit of 2.0 to 4.5% by mass with respect to the whole of the monomer units, and a melt flow rate of 5 to 36 g/10 min.

Effects

According to the present disclosure, there can be provided a power storage assembly in which the permeation of moisture is suppressed in a higher level than in conventional technologies and the infiltration of moisture is also suppressed in a high level also at high temperatures, and moreover, even in the case where the temperature becomes abnormally high, the sealing property is not impaired.

DESCRIPTION OF EMBODIMENTS

Figure 1:
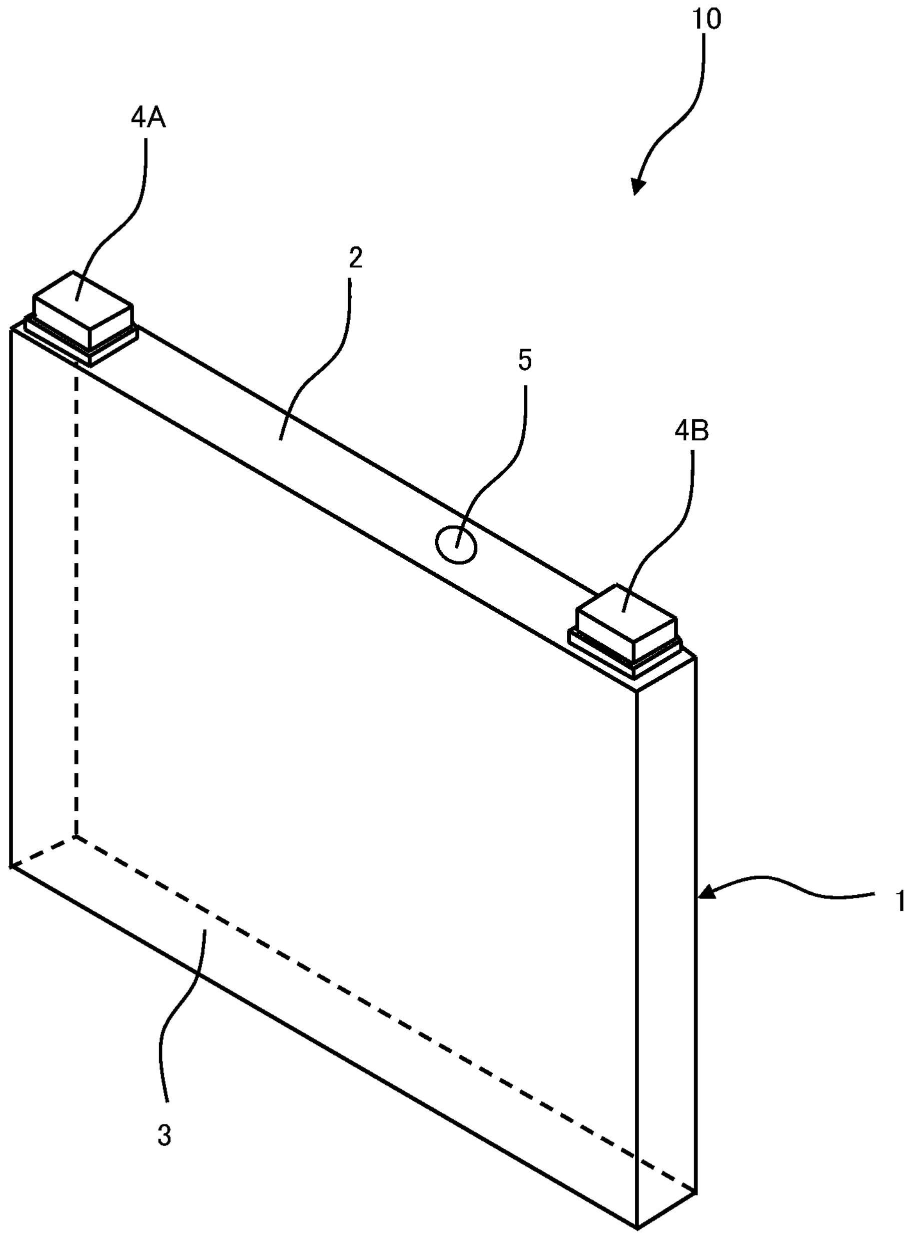
FIG. 1 is an external perspective view of a power storage assembly.

Hereinafter, specific embodiments of the present disclosure will be described in detail, but the present disclosure is not limited to the following embodiments.

A power storage assembly of the present disclosure has a gasket containing a copolymer containing tetrafluoroethylene (TFE) unit and a perfluoro(propyl vinyl ether) (PPVE) unit.

Patent Document 1 describes that inexpensively mass producing a flat non-aqueous electrolyte secondary battery which maintains high reliability to storage under a severe environment such as a high-temperature environment or a high-humidity environment and whose high energy density has been realized is a very important problem in order to enhance the demand of batteries of such a kind. In order to solve the problem, Patent Document 1 uses, as a material of a gasket, a tetrafluoroethylene perfluoroalkyl vinyl ether copolymer (PFA resin) in which the fluorine content is 70% by mol or higher and 85% by mol or lower, and the melt flow rate (MFR) is 20 g/10 min or higher and 45 g/10 min or lower.

However, as power storage assemblies have an elongated life in recent years, even only the gradual permeation of moisture through the gasket and the infiltration thereof into the power storage assemblies may cause the deterioration of the power storage performance. Therefore, a technology which can suppress the permeation of moisture in a higher level than the technology described in Patent Document 1 is demanded. Further, since there increases the use of the power storage assemblies in an environment where the temperature becomes high, it is necessary to suppress the infiltration of moisture into the power storage assemblies also at high temperatures. Although Patent Document 1 confirms the discharge capacity and the presence/absence of the leakage at 70° C., a technology which can prevent the infiltration of moisture also at higher temperatures is demanded.

It has been found that by sealing a power storage assembly by using a gasket containing the copolymer containing the TFE unit and the PPVE unit in which copolymer the content of the PPVE unit and the melt flow rate (MFR) of the copolymer have suitably been controlled, the permeation of moisture can be suppressed in a higher level than by the conventional technology, and the infiltration of moisture can be suppressed in a high level also at high temperatures (for example, 95° C.). Further, it has also been found that the gasket containing such a copolymer exhibits excellent sealability also at high temperatures (for example, 150° C.) and therefore, even in the case where the power storage assembly abnormally generates heat and the temperature becomes high, the sealing property is not impaired. Moreover, it has also been confirmed that such a gasket can be produced in a high productivity.

The power storage assembly of the present disclosure has been completed based on these findings, wherein the permeation of moisture is suppressed in a higher level than in the conventional technology; and the infiltration of moisture is suppressed in a high level also at high temperatures; and moreover, even in the case where the temperature becomes abnormally high, the sealing property is not impaired.

The copolymer contained in the gasket equipped in the power storage assembly of the present disclosure is a melt-fabricable fluororesin. The melt-fabricability means that a polymer can be melted and processed by using conventional processing devices such as an extruder or an injection molding machine.

The content of the PPVE unit of the copolymer is 2.0 to 4.5% by mass with respect to the whole of the monomer units. The content of the PPVE unit of the copolymer is preferably 4.3% by mass or lower, more preferably 4.2% by mass or lower, still more preferably 4.0% by mass or lower, especially preferably 3.3% by mass or lower and most preferably 3.0% by mass or lower, and preferably 2.1% by mass or higher and more preferably 2.3% by mass or higher. Due to that the content of the PPVE unit of the copolymer is in the above range, there can be obtained the power storage assembly in which the permeation of moisture is more suppressed and the infiltration of moisture at high temperatures is also more suppressed, and moreover, even in the case where the temperature becomes abnormally high, the sealing property is less impaired.

The content of the tetrafluoroethylene (TFE) unit of the copolymer is preferably 98.0 to 95.5% by mass with respect to the whole of the monomer units. The content of the TFE unit of the copolymer is more preferably 96.0% by mass or higher, still more preferably 95.7% by mass or higher, further still more preferably 95.8% by mass or higher, especially preferably 96.7% by mass or higher and most preferably 97.0% by mass or higher, and more preferably 97.9% by mass or lower and still more preferably 97.7% by mass or lower. Due to that the content of the TFE unit of the copolymer is in the above range, there can be obtained the power storage assembly in which the permeation of moisture is more suppressed and the infiltration of moisture at high temperatures is also more suppressed, and moreover, even in the case where the temperature becomes abnormally high, the sealing property is less impaired.

In the present disclosure, the content of each monomer unit in the copolymer can be measured by a $^{19}$F-NMR method.

The copolymer may also contain monomer units derived from monomers copolymerizable with TFE and PPVE. In this case, the content of the monomer units copolymerizable with TFE and PPVE is, with respect to the whole of the monomer units of the copolymer, preferably 0 to 3.5% by mass, more preferably 0.05 to 1.7% by mass and still more preferably 0.1 to 0.5% by mass.

The monomers copolymerizable with TFE and PPVE may include hexafluoropropylene (HFP), vinyl monomers represented by $CZ^1Z^2{=}CZ^3(CF_2)_nZ^4$ wherein $Z^1$, $Z^2$ and $Z^3$ are identical or different, and represent H or F; $Z^4$ represents H, F or Cl; and n represents an integer of 2 to 10, and alkyl perfluorovinyl ether derivatives represented by $CF_2{=}CF{-}OCH_2{-}Rf^1$ wherein $Rf^1$ represents a perfluoroalkyl group having 1 to 5 carbon atoms. Among these, HFP is preferred.

The copolymer is preferably at least one selected from the group consisting of a copolymer consisting only of the TFE unit and the PPVE unit, and TFE/HFP/PPVE copolymer, and is more preferably a copolymer consisting only of the TFE unit and the PPVE unit.

The fluorine content of the copolymer is preferably lower than 70% by mol, more preferably 69% by mol or lower, still more preferably 68% by mol or lower and especially preferably 67% by mol or lower, and preferably 65% by mol or higher and more preferably 66% by mol or higher. Due to that the fluorine content of the copolymer is in the above range, there can be obtained the power storage assembly in which the permeation of moisture is more suppressed and the infiltration of moisture at high temperatures is also more suppressed, and moreover, even in the case where the temperature becomes abnormally high, the sealing property is less impaired.

The fluorine content of the copolymer can be determined by calculation from a composition of the monomer units of the copolymer.

The melt flow rate (MFR) of the copolymer is 5 to 36 g/10 min. The MFR of the copolymer is preferably 6 g/10 min or higher, more preferably 7 g/10 min or higher, still more preferably 9 g/10 min or higher and especially preferably 10 g/10 min or higher, and preferably 35 g/10 min or lower, more preferably 34 g/10 min or lower, still more preferably 30 g/10 min or lower, especially preferably 26 g/10 min or lower and most preferably 20 g/10 min or lower. Then, from the viewpoint that molded articles become enabled to be produced remarkably easily by injection molding, the MFR of the copolymer is still more preferably 9 g/10 min or higher and especially preferably 10 g/10 min or higher. Due to that the MFR of the copolymer is in the above range, there can be obtained the power storage assembly in which the infiltration of moisture at high temperatures is more suppressed, and moreover, even in the case where the temperature becomes abnormally high, the sealing property is less impaired.

In the present disclosure, the melt flow rate of the copolymer is a value obtained as a mass (g/10 min) of the polymer flowing out from a nozzle of 2.1 mm in inner diameter and 8 mm in length per 10 min at 372° C. under a load of 5 kg using a melt indexer, according to ASTM D1238.

The MFR can be controlled by controlling the kind and the amount of a polymerization initiator, the kind and the amount of a chain transfer agent, and the like which are to be used in polymerization of the monomers.

The number of functional groups per $10^6$ main-chain carbon atoms of the copolymer is usually more than 50, preferably 75 or more, more preferably 100 or more and still more preferably 150 or more; the upper limit thereof is not limited, but may be 800 or less. By controlling the content of the PPVE unit and the melt flow rate (MFR) of the copolymer and introducing a sufficient number of functional groups to the copolymer, the power storage assembly in which carbon dioxide permeability of the gasket is improved, making carbon dioxide generated in the inside to permeate to the outside and hardly making the carbon dioxide to be detained in the inside can be obtained. Further, since the production of the copolymer having the number in the above range of functional groups is easy, the mass-production of the gasket can easily be realized and the cost of the power storage assembly can be reduced. Even in the case where the number of functional groups of the copolymer is large, by suitably controlling the content of the PPVE unit and the MFR, there can be obtained the power storage assembly in which the permeation of moisture is suppressed in a higher level than in conventional technologies and the infiltration of moisture is also suppressed in a high level also at high temperatures, and moreover, even in the case where the temperature becomes abnormally high, the sealing property is not impaired. Therefore, by using the copolymer having a sufficient number of functional groups, while the expansion of the power storage assembly is suppressed by making carbon dioxide which may be generated during battery usage to permeate to the outside, the infiltration of moisture from the outside can be suppressed, whereby the deterioration of the performance of the power storage assembly can be suppressed.

For identification of the kind of the functional groups and measurement of the number of the functional groups, infrared spectroscopy can be used.

The number of the functional groups is measured, specifically, by the following method. First, the copolymer is molded by cold press to prepare a film of 0.25 to 0.3 mm in thickness. The film is analyzed by Fourier transform infrared spectroscopy to obtain an infrared absorption spectrum, and a difference spectrum against a base spectrum that is completely fluorinated and has no functional groups is obtained. From an absorption peak of a specific functional group observed on this difference spectrum, the number N of the functional group per $1\times10^6$ carbon atoms in the copolymer is calculated according to the following formula (A).

$$N=I\times K/t \quad (A)$$

I: absorbance

K: correction factor t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

TABLE 1

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| $—COOCH_3$ | 1795 | 680 | 342 | $C_7F_{15}COOCH_3$ |
| $—CONH_2$ | 3436 | 506 | 460 | $C_7H_{15}CONH_2$ |
| $—CH_2OH_2$, —OH | 3648 | 104 | 2236 | $C_7H_{15}CH_2OH$ |
| $—CF_2H$ | 3020 | 8.8 | 26485 | $H(CF_2CF_2)_3CH_2OH$ |
| $—CF{=}CF_2$ | 1795 | 635 | 366 | $CF_2{=}CF_2$ |

Absorption frequencies of $—CH_2CF_2H$, $—CH_2COF$, $—CH_2COOH$, $—CH_2COOCH_3$ and $—CH_2CONH_2$ are lower by a few tens of kaysers ($cm^{-1}$) than those of $—CF_2H$, —COF, —COOH free and —COOH bonded, $—COOCH_3$ and $—CONH_2$ shown in the Table, respectively.

For example, the number of the functional group —COF is the total of the number of a functional group determined from an absorption peak having an absorption frequency of 1,883 $cm^{-1}$ derived from $—CF_2COF$ and the number of a functional group determined from an absorption peak having an absorption frequency of 1,840 $cm^{-1}$ derived from $—CH_2COF$.

The functional groups are ones present on main chain terminals or side chain terminals of the copolymer, and ones present in the main chain or the side chains. The number of the functional groups may be the total of numbers of $—CF{=}CF_2$, $—CF_2H$, —COF, —COOH, $—COOCH_3$, $—CONH_2$ and $—CH_2OH$.

The functional groups are introduced to the copolymer by, for example, a chain transfer agent or a polymerization initiator used for production of the copolymer. For example, in the case of using an alcohol as the chain transfer agent, or a peroxide having a structure of $—CH_2OH$ as the polymerization initiator, $—CH_2OH$ is introduced on the main chain terminals of the copolymer. Alternatively, the functional group is introduced on the side chain terminal of the copolymer by polymerizing a monomer having the functional group.

By subjecting such a copolymer having functional groups to a fluorination treatment, the number of the functional groups is reduced. That is, the copolymer is preferably one having been subjected to no fluorination treatment. The copolymer is also preferably one having been subjected to no stabilization treatment such as ammonia treatment.

The melting point of the copolymer is preferably 301 to 317° C., more preferably 305° C. or higher, still more preferably 307° C. or higher and especially preferably 310° C. or higher, and more preferably 315° C. or lower. Due to that the melting point is in the above range, there can be obtained the power storage assembly in which the permeation of moisture is more suppressed and the infiltration of moisture at high temperatures is more suppressed, and moreover, even in the case where the temperature becomes abnormally high, the sealing property is not impaired.

In the present disclosure, the melting point can be measured by using a differential scanning calorimeter [DSC].

In the copolymer of the present disclosure, the quantity of heat of melting as measured by differential scanning calorimetry is preferably 24.0 mJ/mg or higher, more preferably 25.0 mJ/mg or higher and still more preferably 28.0 mJ/mg or higher, and preferably 40.0 mJ/mg or lower and more preferably 38.0 mJ/mg or lower. Due to that the quantity of heat of melting is in the above range, there can be obtained the power storage assembly in which the permeation of moisture is more suppressed and the infiltration of moisture at high temperatures is more suppressed, and moreover, even in the case where the temperature becomes abnormally high, the sealing property is not impaired.

The water vapor permeability of the copolymer is preferably 12 g·cm/m$^2$ or lower, more preferably 11 g·cm/m$^2$ or lower, still more preferably 10 g·cm/m$^2$ or lower and especially preferably 9.0 g·cm/m$^2$ or lower. Due to that the water vapor permeability of the copolymer is in the above range, the power storage assembly suppressed in the permeation of moisture from the outside in a high level can be obtained. The water vapor permeability of the copolymer can be reduced by controlling the content of the PPVE unit and the MFR of the copolymer.

The water vapor permeability of the copolymer can be specified by using a film of the copolymer and measuring the mass of water vapor permeating the film under the condition of at a temperature of 95° C. and for 30 days. The lower the value, in the case where the copolymer is made into a gasket, the more the water vapor infiltrating and diffusing in and permeating through the body interior of the gasket can be reduced, and it can be said that the water vapor permeating in the gasket from the externally exposed face toward the internally exposed surface is in the state of being suppressed. Therefore, by using a gasket containing the copolymer low in the water vapor permeability, the power storage assembly suppressed in the moisture permeation in a high level can be obtained.

The water vapor leak amount of the copolymer may be 0.0045 g/1,000 hours or smaller, and is preferably 0.0039 g/1,000 hours or smaller, more preferably 0.0036 g/1,000 hours or smaller, still more preferably 0.0030 g/1,000 hours or smaller and especially preferably 0.0027 g/1,000 hours or smaller; the lower limit thereof is not limited, but may be 0.0015 g/1,000 hours or larger. Due to that the water vapor leak amount is in the above range, the power storage assembly more suppressed in the infiltration of moisture at high temperatures can be obtained. The water vapor leak amount can be reduced by controlling the content of the PPVE unit and the MFR of the copolymer.

The water vapor leak amount of the copolymer can be measured by using a gasket (outer diameter: ϕ17.7 mm, inner diameter: ϕ14.3 mm, thickness: 1.6 mmt) obtained by injection molding the copolymer, and measuring the reduced mass of moisture in a space sealed by installing the gasket, under the condition of at 95° C. and for 1,000 hours. The water vapor leak amount of the copolymer, in the case where the copolymer is made into a gasket, is the total of a permeating amount of water vapor permeating in the gasket in the face direction and an amount of water vapor passing through contacting faces of the gasket with power storage assembly constituting members. It can be said that the lower the value, in the case where the copolymer is made into a gasket, the more the infiltration of moisture from the face direction of the gasket can be suppressed. Therefore, by using the gasket containing the copolymer small in the water vapor leak amount at 95° C., the power storage assembly suppressed in the infiltration of moisture also at high temperatures in a high level is obtained.

The storage elastic modulus (E') at 150° C. of the copolymer is preferably 10 MPa or higher and more preferably 50 MPa or higher, and preferably 1,000 MPa or lower, more preferably 500 MPa or lower and still more preferably 200 MPa or lower. The copolymer satisfying the above range regarding the storage elastic modulus (E') at 150° C. enables to provide the power storage assembly having a sealing property which can be much less deteriorated even in the case where the temperature becomes abnormally high.

The storage elastic modulus (E') can be measured by carrying out a dynamic viscoelasticity measurement under the condition of a temperature-increasing rate of 2° C./min and a frequency of 10 Hz and in the range of 30 to 250° C.

The surface pressure at 150° C. of the copolymer is preferably 0.2 MPa or higher, more preferably 0.5 MPa or higher, still more preferably 1.0 MPa or higher, especially preferably 1.1 MPa or higher and most preferably 1.4 MPa or higher; and the upper limit thereof is not limited, but may be 2.5 MPa or lower. The gasket containing the copolymer having high surface pressure at 150° C. can exhibit excellent sealability at high temperatures. Therefore, use of a gasket containing such a copolymer enables to provide the power storage assembly having a sealing property which can be much less deteriorated even in the case where the temperature becomes abnormally high. The surface pressure at 150° C. of the copolymer can be raised by controlling the content of the PPVE unit and the melt flow rate (MFR) of the copolymer.

The surface pressure can be determined as follows. A test piece is deformed at a compression deformation rate of 50%, allowed to stand as is at 150° C. for 18 hours, released from the compressive state and allowed to stand at room temperature for 30 min, and thereafter, the height of the test piece (height of the test piece after being compressively deformed) is measured; and the surface pressure can be calculated by the following formula using the height of the test piece after being compressively deformed, and the storage elastic modulus (MPa) at 150° C.

$$\text{surface pressure at } 150° \text{ C. (MPa)}=(t_2-t_1)/t_1\times E'$$

$t_1$: an original height (mm) of a test piece before being compressively deformed×50%

$t_2$: a height (mm) of the test piece after being compressively deformed

E': a storage elastic modulus (MPa) at 150° C.

The carbon dioxide permeability coefficient of the copolymer is preferably 50 $cm^3\cdot mm/(m^2\cdot h\cdot atm)$ or higher and more preferably 54 $cm^3\cdot mm/(m^2\cdot h\cdot atm)$ or higher. It has been found that by controlling the content of the PPVE unit and the melt flow rate (MFR) of the copolymer, and introducing a relatively large number of functional groups to the copolymer, the copolymer having a relatively high carbon dioxide permeability coefficient can be obtained. Therefore, by using the gasket containing such a copolymer, the power storage assembly inside which carbon dioxide is hardly detained can be obtained.

In the present disclosure, the carbon dioxide permeability coefficient can be measured under the condition of at a test temperature of 70° C. and a test humidity of 0% RH. The specific measurement of the carbon dioxide permeability coefficient can be carried out by a method described in Examples.

The copolymer for forming the gasket equipped in the power storage assembly of the present disclosure can be produced by a polymerization method such as suspension polymerization, solution polymerization, emulsion polymerization or bulk polymerization. The polymerization method is preferably emulsion polymerization or suspension polymerization. In these polymerization methods, conditions such as temperature and pressure, and a polymerization initiator and other additives can suitably be set depending on the formulation and the amount of the copolymer.

As the polymerization initiator, an oil-soluble radical polymerization initiator, or a water-soluble radical polymerization initiator may be used.

The oil-soluble radical polymerization initiator may be a known oil-soluble peroxide, and examples thereof typically include:

- dialkyl peroxycarbonates such as di-n-propyl peroxydicarbonate, diisopropyl peroxydicarbonate, di-sec-butyl peroxydicarbonate and di-2-ethoxyethyl peroxydicarbonate;
- peroxyesters such as t-butyl peroxyisobutyrate and t-butyl peroxypivalate;
- dialkyl peroxides such as di-t-butyl peroxide; and
- di[fluoro(or fluorochloro)acyl] peroxides.

The di[fluoro(or fluorochloro)acyl]peroxides include diacyl peroxides represented by $[(RfCOO)—]_2$ wherein Rf is a perfluoroalkyl group, an ω-hydroperfluoroalkyl group or a fluorochloroalkyl group.

Examples of the di[fluoro(or fluorochloro)acyl]peroxides include di(ω-hydro-dodecafluorohexanoyl) peroxide, di((ω-hydro-tetradecafluoroheptanoyl) peroxide, di(ω-hydro-hexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di((ω-chloro-hexafluorobutyryl) peroxide, di(ω-chloro-decafluorohexanoyl) peroxide, di(ω-chloro-tetradecafluorooctanoyl) peroxide, (ω-hydrodo-decafluoroheptanoyl-ω-hydrohexadecafluorononanoyl peroxide, (ω-chloro-hexafluorobutyryl-ω-chloro-decafluorohexanoyl peroxide, co-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorotriacontafluorodocosanoyl) peroxide.

The water-soluble radical polymerization initiator may be a known water-soluble peroxide, and examples thereof include ammonium salts, potassium salts and sodium salts of persulfuric acid, perboric acid, perchloric acid, perphosphoric acid, percarbonic acid and the like, organic peroxides such as disuccinoyl peroxide and diglutaroyl peroxide, and t-butyl permaleate and t-butyl hydroperoxide. A reductant such as a sulfite salt may be combined with a peroxide and used, and the amount thereof to be used may be 0.1 to 20 times with respect to the peroxide.

In the polymerization, a surfactant, a chain transfer agent and a solvent may be used, which are conventionally known.

The surfactant may be a known surfactant, for example, nonionic surfactants, anionic surfactants and cationic surfactants may be used. Among these, fluorine-containing anionic surfactants are preferred, and more preferred are linear or branched fluorine-containing anionic surfactants having 4 to 20 carbon atoms, which may contain an ether bond oxygen (that is, an oxygen atom may be inserted between carbon atoms). The amount of the surfactant to be added (with respect to water in the polymerization) is preferably 50 to 5,000 ppm.

Examples of the chain transfer agent include hydrocarbons such as ethane, isopentane, n-hexane and cyclohexane; aromatics such as toluene and xylene; ketones such as acetone; acetate esters such as ethyl acetate and butyl acetate; alcohols such as methanol and ethanol; mercaptans such as methylmercaptan; and halogenated hydrocarbons such as carbon tetrachloride, chloroform, methylene chloride and methyl chloride. The amount of the chain transfer agent to be added may vary depending on the chain transfer constant value of the compound to be used, but is usually in the range of 0.01 to 20% by mass with respect to the solvent in the polymerization.

The solvent may include water and mixed solvents of water and an alcohol.

In the suspension polymerization, in addition to water, a fluorosolvent may be used. The fluorosolvent may include hydrochlorofluoroalkanes such as $CH_3CClF_2$, $CH_3CCl_2F$, $CF_3CF_2CCl_2H$ and $CF_2ClCF_2CFHCl$; chlorofluoroalaknes such as $CF_2ClCFClCF_2CF_3$ and $CF_3CFClCFClCF_3$; hydrofluroalkanes such as $CF_3CFHCFHCF_2CF_2CF_3$, $CF_2HCF_2CF_2CF_2CF_2H$ and $CF_3CF_2CF_2CF_2CF_2CF_2CF_2H$; hydrofluoroethers such as $CH_3OC_2F_5$, $CH_3OC_3F_5CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$ and $CF_3CHFCF_2OCH_2CF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, and among these, perfluoroalkanes are preferred. The amount of the fluorosolvent to be used is, from the viewpoint of the suspensibility and the economic efficiency, preferably 10 to 100% by mass with respect to an aqueous medium.

The polymerization temperature is not limited, and may be 0 to 100° C. The polymerization pressure is suitably set depending on other polymerization conditions to be used such as the kind, the amount and the vapor pressure of the solvent, and the polymerization temperature, but may usually be 0 to 9.8 MPaG.

In the case of obtaining an aqueous dispersion containing the copolymer by the polymerization reaction, the copolymer can be recovered by coagulating, cleaning and drying the copolymer contained in the aqueous dispersion. Then in the case of obtaining the copolymer as a slurry by the polymerization reaction, the copolymer can be recovered by taking out the slurry from a reaction container, and cleaning and drying the slurry. The copolymer can be recovered in a shape of powder by the drying.

The drying of the copolymer can be carried out in the range of 100 to 250° C. and in the range of 4 to 128 hours. The drying can be carried out by using a dryer. The drying suitably uses a usually known drying method such as drying by a hot-air dryer.

The copolymer obtained by the polymerization may be formed into pellets. A method of forming into pellets is not limited, and a conventionally known method can be used. Examples thereof include methods of melt extruding the copolymer by using a single-screw extruder, a twin-screw extruder or a tandem extruder and cutting the resultant into a predetermined length to form the copolymer into pellets. The extrusion temperature in the melt extrusion needs to be varied depending on the melt viscosity and the production method of the copolymer, and is preferably the melting point of the copolymer+20° C. to the melting point of the copolymer+140° C. A method of cutting the copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water of 30 to 200° C., steam of 100 to 200° C. or hot air of 40 to 200° C.

Alternatively, the copolymer obtained by the polymerization may be subjected to fluorination treatment. The fluorination treatment can be carried out by bringing the copolymer having been subjected to no fluorination treatment into contact with a fluorine-containing compound. By the fluorination treatment, thermally unstable functional groups of the copolymer, such as —COOH, —$COOCH_3$, —$CH_2OH$, —COF, —$CF{=}CF_2$ and —$CONH_2$, and thermally relatively stable functional groups thereof, such as —$CF_2H$, can be converted to thermally very stable —$CF_3$. Consequently, the total number (number of functional groups) of —COOH, —$COOCH_3$, —$CH_2OH$, —COF, —$CF{=}CF_2$, —$CONH_2$ and —$CF_2H$ of the copolymer can be reduced.

The fluorine-containing compound is not limited, but includes fluorine radical sources generating fluorine radicals under the fluorination treatment condition. The fluorine radical sources include $F_2$ gas, $CoF_3$, $AgF_2$, $UF_6$, $OF_2$, $N_2F_2$, $CF_3OF$, halogen fluorides (for example, $IF_5$ and $ClF_3$).

The fluorine radical source such as $F_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas includes nitrogen gas, helium gas and argon gas, but from the viewpoint of the economic efficiency, nitrogen gas is preferred.

The condition of the fluorination treatment is not limited, and the copolymer in a melted state may be brought into contact with the fluorine-containing compound, but the fluorination treatment can be carried out usually at a temperature of not higher than the melting point of the copolymer, preferably at 20 to 240° C. and more preferably at 100 to 220° C. The fluorination treatment is carried out usually for 1 to 30 hours and preferably 5 to 25 hours. The fluorination treatment is preferred which brings the copolymer having been subjected to no fluorination treatment into contact with fluorine gas ($F_2$ gas).

The gasket, as required, may contain other components. The other components may include fillers, plasticizers, pigments, colorants, antioxidants, ultraviolet absorbents, flame retarders, antiaging agents, antistatic agents and antibacterial agents.

As the other components, above all, fillers are preferred. Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube and glass fiber.

As described above, the gasket can contain other components other than the copolymer. However, from the viewpoint of making the gasket to sufficiently exhibit excellent properties of the copolymer, the gasket preferably contains less amounts of the other components, and most preferably contains no other components. Specifically, the amount of the other components is, with respect to the mass of the gasket, preferably 30% by mass or lower, more preferably 10% by mass or lower and most preferably 0% by mass, that is, it is most preferable that the gasket contains no other components. The gasket may be one consisting only of the copolymer.

The gasket can be produced by molding the copolymer or a composition containing the copolymer and the other components into a desired shape and size. A method of producing the composition includes a method of dry mixing the copolymer and the other components, and a method of previously mixing the copolymer and the other components by a mixer and then melt kneading the mixture by a kneader, melt extruder or the like.

A method of molding the copolymer or the composition is not limited, and includes injection molding, extrusion forming, compression molding, blow molding and transfer molding. Among these, preferred are compression molding, injection molding or transfer molding; and injection molding or transfer molding are more preferred because the gasket can be produced in a high productivity. That is, the gasket is preferably an injection molded article or a transfer molded article, because the gasket can be produced in a high productivity.

Then, a power storage assembly according to one embodiment of the present disclosure will be described by reference to the drawings.

A power storage assembly illustrated in FIG. 1 is a closed rectangular secondary battery. The power storage assembly 10 has an exterior can 1 and a lid 2. The exterior can 1 has an opening (not shown in figure) formed on the upper part facing the bottom face 3. The exterior can 1 is constituted, for example, of aluminum, an aluminum alloy or stainless steel. In the power storage assembly 10, for example, the voltage is 3.0 V or higher.

In the exterior can 1, an electric element (not shown in figure) such as a power generator is housed, and the opening of the exterior can is hermetically sealed with the lid 2. The peripheral portion of the lid 2 is joined to the edge portion of the opening of the exterior can 1.

The lid 2 is provided with a liquid injection hole for injecting an electrolytic solution in the exterior can 1. The electrolytic solution may be one or two or more known solvents such as propylene carbonate, ethylene carbonate, butylene carbonate, 7-butyrolactone, 1,2-dimethoxyethane, 1,2-diethoxyethane, dimethyl carbonate, diethyl carbonate and ethyl methyl carbonate. Solutions can also be used in which an electrolyte is dissolved in an electrolytic solution. The electrolyte is not limited, but may be $LiClO_4$, $LiAsF_6$, $LiPF_6$, $LiBF_4$, LiCl, LiBr, $CH_3SO_3Li$, $CF_3SO_3Li$, cesium carbonate and the like.

After the electrolytic solution is injected through the liquid injection hole into the exterior can 1, the liquid injection hole is installed with a plug 5, and the plug 5 is jointed to the edge portion of the liquid injection hole of the lid 2. The joining can be carried out by welding using laser.

The lid 2 is installed with a first external terminal 4A and a second external terminal 4B; and an externally generated electric power is supplied through the first external terminal 4A and the second external terminal 4B to the electric element, and is stored in the power storage assembly; and then, the power is supplied to an external load. For example, the first external terminal 4A is a positive electrode terminal; and the second external terminal 4B is a negative electrode terminal. The first external terminal 4A is constituted, for example, of aluminum or an aluminum alloy. The second external terminal 4B is constituted, for example, of copper or a copper alloy.

Figure 2:
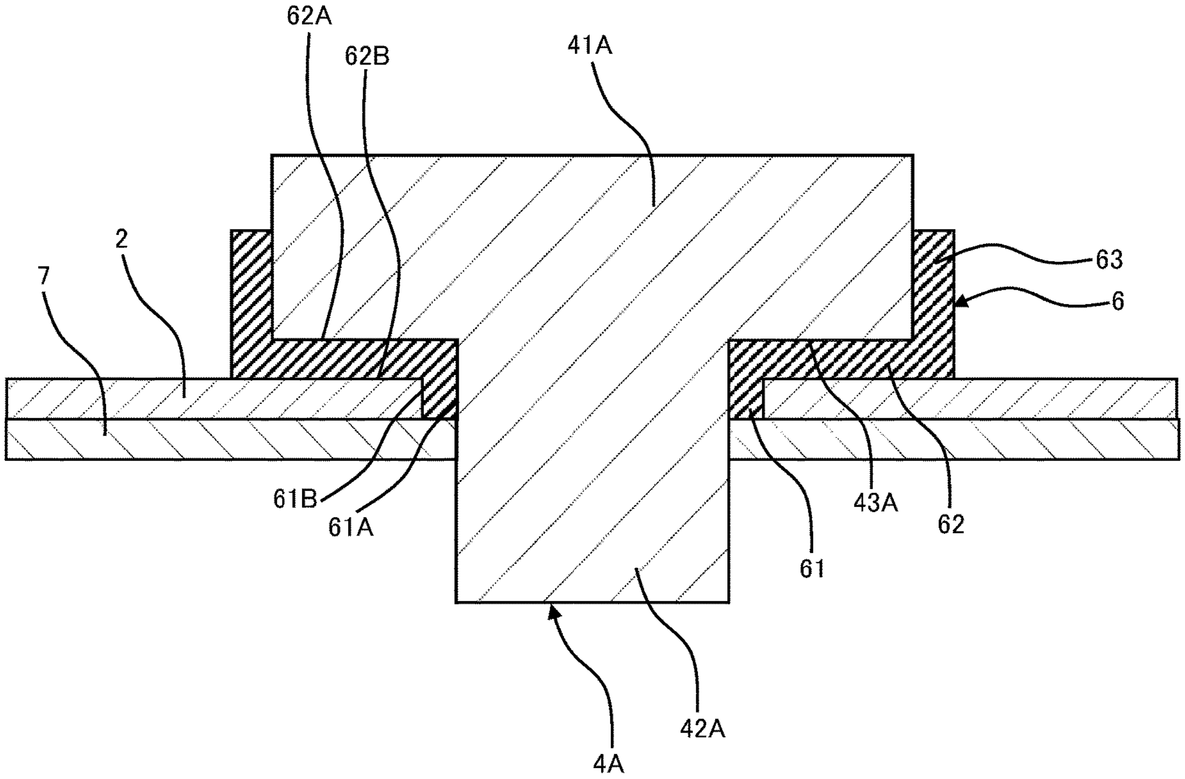
FIG. 2 is a schematic cross-sectional view illustrating a constitution of a terminal part of a power storage assembly.

In order to electrically insulate the first external terminal 4A and the second external terminal 4B from the lid 2, gaskets 6 and insulating members 7 are installed on the lid 2. FIG. 2 is a schematic cross-sectional view illustrating a constitution of a terminal part of a power storage assembly. Places are usually different where the first external terminal and the second external terminal are arranged on a constituting material or the lid 2, but since the other constitutions can be made identical, the following description will be made by way of an example of the first external terminal 4A.

As illustrated in FIG. 2, the first external terminal 4A has a terminal head part 41A having a rectangular parallelepiped block shape and a cylindrical shaft part 42A. The terminal head part 41A has an external profile of a rectangular lower face 43A; and the shaft part 42A protrudes from the lower face 43A of the terminal head part 41A.

As illustrated in FIG. 2, the gasket 6 has a cylindrical part 61, a flange part 62 extending from one opening of the cylindrical part 61 in the radial direction, and a side wall part 63 rising from the periphery of the flange part 62.

The cylindrical part 61 is externally fitted on the shaft part 42A of the first external terminal 4A, and the contacting face 61A of the inner peripheral portion of the cylindrical part 61 makes contact with an outer peripheral face of the shaft part 42A. Then, the cylindrical part 61 is inserted in a through-hole of the lid 2, and the contacting face 61B of the outer peripheral portion of the cylindrical part 61 makes contact with the inner peripheral face of the through-hole of the lid 2.

The flange part 62 is held between the lid 2 and the first external terminal 4A, and the contacting face 62A of the flange part 62 makes contact with the lower face 43A of the first external terminal 4A. Further, the contacting face 62B of the flange part 62 makes contact with a front side of the lid 2. The flange part 62 may be held between the lid 2 and the external terminal 4A through adhesive layers, but in the power storage assembly 10, the flange part 62 makes direct contact with the lid 2 and the external terminal 4A, securing the sealing property of the power storage assembly. In the power storage assembly 10, although the lower face 43A of the first external terminal 4A and the front side of the lid 2 are planar, alternatively, by installing a projection, a step or the like on either one of or both of the lower face 43A of the first external terminal 4A and the front side of the lid 2, and holding the flange part 62 between the lid 2 and the external terminal 4A, making larger the compressibility of a part of the flange part 62 than that of the other part thereof, the sealing property of the power storage assembly may be secured. In the power storage assembly 10, although each contacting face of the flange part 62 is planar, alternatively, by installing a protruding portion or an inclination on either one of or both of the contacting faces of the flange part 62, and holding the flange part 62 between the lid 2 and the external terminal 4A, making larger the compressibility of a part of the flange part 62 than that of the other part thereof, the sealing property of the power storage assembly may be secured.

The gasket 6 makes contact with the first external terminal 4A and the lid 2 in the state that the cylindrical part 61 and the flange part 62 of the gasket 6 are compressed, and the sealing property of the power storage assembly can thereby be secured.

By suitably controlling the content of the PPVE unit and the melt flow rate (MFR) of the copolymer to form the gasket 6, as well as suitably controlling the thickness of the gasket 6, the sealing property of the power storage assembly can be further enhanced. The thickness of the gasket is preferably 0.5 to 2.5 mm, more preferably 2.0 mm or smaller, still more preferably 1.5 mm or smaller, especially preferably 1.2 mm or smaller and most preferably 1.0 mm or smaller. It is likely that the smaller the thickness of the gasket, the more the permeating amount of moisture in the gasket can be reduced, but when the thickness of the gasket is too small, a sufficient rebound resilience is not attained and there may not be reduced sufficiently the amount of moisture leaking from contacting faces of the gasket with the power storage assembly constituting members to the outside. By suitably controlling the content of the PPVE unit and the melt flow rate (MFR) of the copolymer and suitably controlling the thickness of the gasket, the amount of moisture permeating in the gasket can be reduced and the amount of moisture leaking from contacting faces between the gasket and the power storage assembly constituting members to the outside can be reduced.

Figure 3:
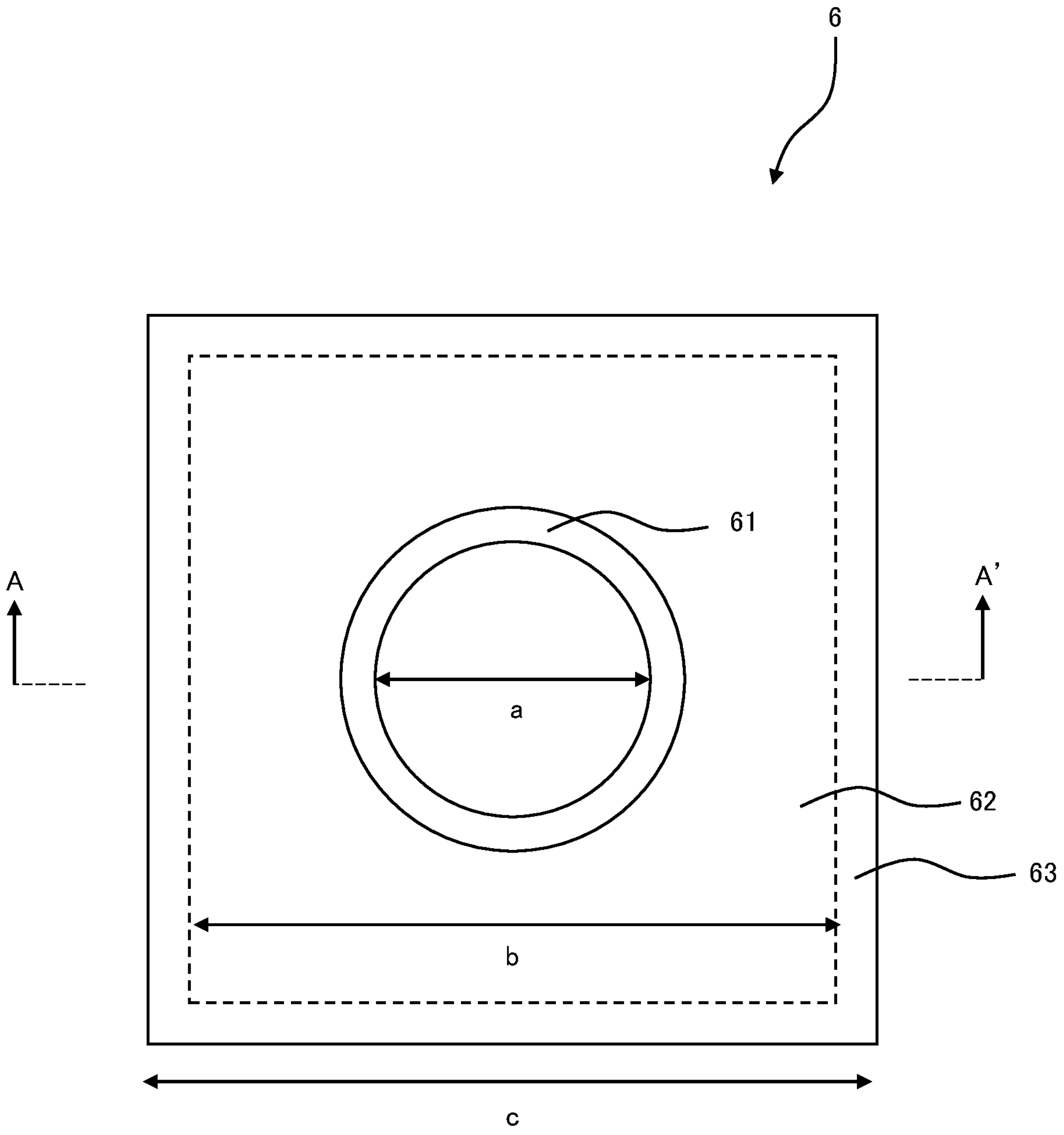
FIG. 3 is a front view of a gasket.
Figure 4:
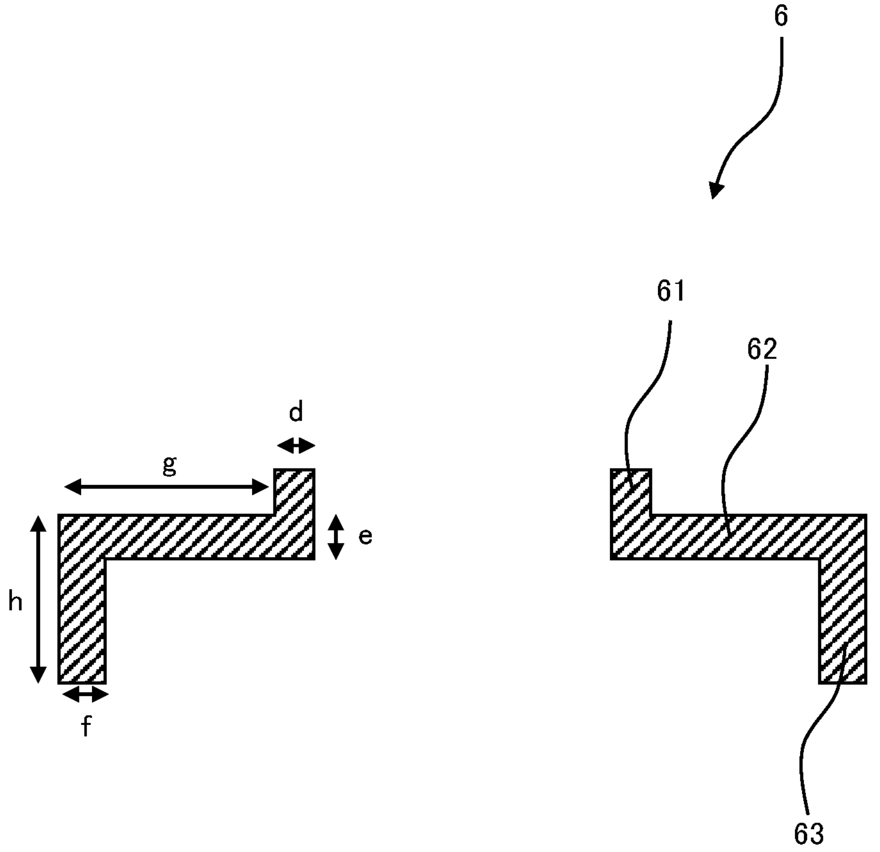
FIG. 4 is a cross-sectional view taken on line A-A' of FIG. 3.

FIG. 3 is a front view of the gasket 6; and FIG. 4 is a cross-sectional view taken on line A-A' of the gasket 6. In the present disclosure, the thickness of the gasket refers to the thickness of parts contributing to the sealing property of the power storage assembly, and is, in the gasket 6 illustrated in FIG. 4, thickness d and thickness e. The thickness d and the thickness e may be different from each other as in the gasket illustrated in FIG. 4, or may be identical. In either the case of the thickness d and the thickness e being identical or the case of being different, it is preferable that the thicknesses of the both are suitably controlled. Then, in consideration of the productivity of the gasket, since that variation in the thicknesses is preferably not large, the thicknesses of parts of the whole gasket may be controlled in the above range. In the gasket illustrated in FIG. 4, not only the thickness d and the thickness e, but also the thickness f is suitably controlled to fall in the above range.

By suitably controlling the content of the PPVE unit and the melt flow rate (MFR) of the copolymer to form the gasket 6, as well as suitably controlling the sealing area of the gasket 6, the sealing property of the power storage assembly can further be enhanced. The sealing area of the gasket is preferably 0.5 to 50 $cm^2$, and the upper limit thereof is more preferably 35 $cm^2$, still more preferably 20 $cm^2$, especially preferably 10 $cm^2$ and most preferably 5 $cm^2$; and the lower limit thereof is more preferably 1 $cm^2$ and still more preferably 2 $cm^2$. A smaller sealing area of the gasket gives a larger distance between the inside and the outside of the power storage assembly, and the infiltration of moisture can much more be suppressed, but since downsizing of the power storage assembly is demanded, it is difficult for conventional gaskets to reduce the sealing area and simultaneously sufficiently suppress the infiltration of moisture. The gasket to be used in the present disclosure, since the copolymer is suitably controlled in terms of the content of the PPVE unit and the melt flow rate (MFR), by thus making small the sealing area of the gasket, achieves the downsizing of the power storage assembly and simultaneously can much more suppress the infiltration of moisture.

In the present disclosure, the sealing area of the gasket is an area of portions contributing to the sealing property of the power storage assembly, and is, in the gasket 6 illustrated in FIG. 2, a total area of the contacting faces 61A, 61B, 62A and 62B.

By suitably controlling the content of the PPVE unit and the melt flow rate (MFR) of the copolymer forming the gasket 6, as well as suitably controlling the compression deformation rate of the gasket, the sealing property of the power storage assembly can be further enhanced. The compression deformation rate of the gasket is preferably 20 to 60%. The compression deformation rate of the gasket can be calculated by the following formula.

Compression deformation rate (%)=[(a thickness of the gasket before being compressed)−(a thickness of the gasket in the compressed state)]/(the thickness of the gasket before being compressed)×100

The maximum rebound resilience (contacting pressure) of the gasket when the gasket is deformed at a compression deformation rate of 20 to 60% is preferably 10 MPa or higher. In the power storage assembly 10 illustrated in FIG. 1, for example, the flange part 62 of the gasket 6 is deformed at a compression deformation rate of 20 to 60% by the lid 2 and the external terminal 4A, and the contacting face 62A and the contacting face 62B of the flange part 62 in a state of being compressed can exhibit a pressure of 10 MPa or higher at highest against the lower face 43A of the external terminal 4A and the front side of the lid 2, respectively.

In one embodiment, a gasket illustrated in FIG. 3 and FIG. 4 has the following size.

a: 4.0 mm
b: 9.4 mm
c: 10.6 mm
d: 0.5 mm
e: 0.6 mm
f: 0.6 mm
g: 2.8 mm
h: 2.2 mm

A power storage assembly of a first embodiment has a gasket wherein the thickness of the gasket is 0.5 to 2.5 mm; the sealing area of the gasket is 0.5 to 50 $cm^2$; in the power storage assembly, the gasket is in a state of being compressed at a compression deformation rate of 20 to 60%; the gasket contains the copolymer containing the tetrafluoroethylene unit and the perfluoro(propyl vinyl ether) unit, and the content of the PPVE unit of the copolymer is 2.0 to 4.0% by mass with respect to the whole of the monomer units; and the MFR is 5 to 36 g/10 min.

The power storage assembly of the first embodiment has the copolymer limited in the content of the PPVE unit and the MFR of the copolymer. Such a copolymer can exhibit a water vapor leak amount of 0.0030 g/1,000 hours or smaller and can exhibit a surface pressure at 150° C. of 1.0 MPa or higher. Therefore, there can be obtained the power storage assembly in which the infiltration of moisture at high temperatures is more suppressed, and moreover, even in the case where the temperature becomes abnormally high, the sealing property is less impaired.

A power storage assembly of a second embodiment has a gasket wherein the thickness of the gasket is 0.5 to 2.5 mm; the sealing area of the gasket is 0.5 to 50 $cm^2$; in the power storage assembly, the gasket is in a state of being compressed at a compression deformation rate of 20 to 60%; the gasket contains the copolymer containing the tetrafluoroethylene unit and the perfluoro(propyl vinyl ether) unit, and the content of the PPVE unit of the copolymer is 2.0 to 3.3% by mass with respect to the whole of the monomer units; and the MFR is 7 to 36 g/10 min.

The power storage assembly of the second embodiment has the copolymer more limited in the content of the PPVE unit and the MFR of the copolymer than those of the gasket of the power storage assembly of the first embodiment. Such a copolymer can exhibit a water vapor leak amount of 0.0030 g/1,000 hours or smaller and can exhibit a surface pressure at 150° C. of 1.1 MPa or higher. Therefore, there can be obtained the power storage assembly in which the infiltration of moisture at high temperatures is more suppressed, and moreover, even in the case where the temperature becomes abnormally high, the sealing property is less impaired.

A power storage assembly of a third embodiment has a gasket wherein the thickness of the gasket is 0.5 to 2.5 mm; the sealing area of the gasket is 0.5 to 50 $cm^2$; in the power storage assembly, the gasket is in a state of being compressed at a compression deformation rate of 20 to 60%; the gasket contains the copolymer containing the tetrafluoroethylene unit and the perfluoro(propyl vinyl ether) unit, and the content of the PPVE unit of the copolymer is 2.0 to 3.3% by mass with respect to the whole of the monomer unit; and the MFR is 7 to 26 g/10 min.

The power storage assembly of the third embodiment has the copolymer more limited in the content of the PPVE unit and the MFR of the copolymer than those of the gaskets of the power storage assemblies of the first and second embodiments. Such a copolymer can exhibit a water vapor leak amount of 0.0030 g/1,000 hours or smaller and can exhibit a surface pressure at 150° C. of 1.4 MPa or higher. Therefore, there can be obtained the power storage assembly in which the infiltration of moisture at high temperatures is much more suppressed, and moreover, even in the case where the temperature becomes abnormally high, the sealing property is much less impaired.

A power storage assembly of a fourth embodiment has a gasket wherein the thickness of the gasket is 0.5 to 2.5 mm; the sealing area of the gasket is 0.5 to 50 $cm^2$; in the power storage assembly, the gasket is in a state of being compressed at a compression deformation rate of 20 to 60%; the gasket contains the copolymer containing the tetrafluoroethylene unit and the perfluoro(propyl vinyl ether) unit, and the content of the PPVE unit of the copolymer is, 2.0 to 2.8% by mass with respect to the whole of the monomer units; and the MFR is 7 to 20 g/10 min.

The power storage assembly of the fourth embodiment has the copolymer more limited in the content of the PPVE unit and the MFR of the copolymer than those of the gaskets of the power storage assemblies of the first, second and third embodiments. Such a copolymer can exhibit a water vapor leak amount of 0.0030 g/1,000 hours or smaller and can exhibit a surface pressure at 150° C. of 1.7 MPa or higher. Therefore, there can be obtained the power storage assembly in which the infiltration of moisture at high temperatures is still much more suppressed, and moreover, even in the case where the temperature becomes abnormally high, the sealing property is still much less impaired.

In the power storage assemblies of the first to fourth embodiments, as the copolymer or the gasket, the copolymer or the gasket having the above-mentioned suitable constitution can be used.

In FIG. 1 and FIG. 2, a closed rectangular secondary battery has been described as the power storage assembly, but the power storage assembly of the present disclosure may be other types of power storage assembly. The power storage assembly may be, for example, a primary battery or may be, for example, a power storage battery (secondary battery) or a power storage element. The power storage assembly may also be a nonaqueous electrolyte battery. The nonaqueous electrolyte battery includes every battery having an electrolytic solution and an electric power generating element. Examples of the nonaqueous electrolyte battery include lithium ion primary batteries, lithium ion secondary batteries, nickel hydrogen batteries, lithium ion capacitors and electric double layer capacitors. These can be used as vehicular power storage batteries or stationary power storage batteries.

So far, embodiments have been described, but it is to be understood that various changes and modifications of patterns and details may be made without departing from the subject matter and the scope of the claims.

According to the present disclosure, there is provided a power storage assembly comprising a gasket containing a copolymer containing tetrafluoroethylene unit and a perfluoro(propyl vinyl ether) unit, wherein the copolymer has a content of the perfluoro(propyl vinyl ether) unit of 2.0 to 4.5% by mass with respect to the whole of the monomer units, and a melt flow rate of 5 to 36 g/10 min.

The thickness of the gasket is preferably 0.5 to 2.5 mm.

The sealing area of the gasket is preferably 0.5 to 50 $cm^2$.

In the power storage assembly, the gasket is preferably in the state of being compressed at a compression deformation rate of 20 to 60%.

The melting point of the copolymer is preferably 301 to 317° C.

The quantity of heat of melting of the copolymer is preferably 24.0 mJ/mg or higher.

The fluorine content of the copolymer is preferably lower than 70% by mol.

The number of functional groups of the copolymer is preferably more than 50 per $10^6$ main-chain carbon atoms.

The gasket is preferably an injection molded article or a transfer molded article.

The power storage assembly preferably has an exterior can, an electric element housed in the exterior can, a lid to close an opening of the exterior can, and an external terminal installed on the lid, and the gasket is held between the lid and the external terminal.

EXAMPLES

The embodiments of the present disclosure will be described by Experimental Examples as follows, but the present disclosure is not limited only to these Experimental Examples.

Each numerical value in Experimental Examples and Comparative Examples was measured by the following methods.

(Content of a Monomer Unit)

The content of each monomer unit was measured by an NMR analyzer (for example, manufactured by Bruker BioSpin GmbH, AVANCE 300, high-temperature probe).

(Melt Flow Rate (MFR))

The polymer was made to flow out from a nozzle of 2.1 mm in inner diameter and 8 mm in length at 372° C. under a load of 5 kg by using a Melt Indexer G-01 (manufactured by Toyo Seiki Seisaku-sho, Ltd.) according to ASTM D1238, and the mass (g/10 min) of the polymer flowing out per 10 min was determined.

(Number of Functional Groups)

Pellets of the copolymer was molded by cold press into a film of 0.25 to 0.3 mm in thickness. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that is completely fluorinated and has no functional groups is obtained. From an absorption peak of a specific functional group observed on this difference spectrum, the number N of the functional group per $1\times10^6$ carbon atoms in the sample was calculated according to the following formula (A).

$$N=I\times K/t \tag{A}$$

I: absorbance

K: correction factor t: thickness of film (mm)

Regarding the functional groups in the present disclosure, for reference, the absorption frequency, the molar absorption coefficient and the correction factor are shown in Table 2. The molar absorption coefficients are those determined from FT-IR measurement data of low molecular model compounds.

TABLE 2

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —$CF_2H$ | 3020 | 8.8 | 26485 | $H(CF_2CF_2)_3CH_2OH$ |
| —$CF{=}CF_2$ | 1795 | 635 | 366 | $CF_2{=}CF_2$ |

(Melting Point (2nd), Quantity of Heat of Melting (2nd))

The polymer was heated, as a first temperature raising-step, at a temperature-increasing rate of 10° C./min from 200° C. to 350° C., then cooled at a cooling rate of 10° C./min from 350° C. to 200° C., and then again heated, as a second temperature raising step, at a temperature-increasing rate of 10° C./min from 200° C. to 350° C. by using a differential scanning calorimeter (trade name: X-DSC7000, manufactured by Hitachi High-Tech Science Corporation); and the melting point was determined from a melting curve peak observed in the second temperature raising step, and the quantity of heat of melting was determined from the area of the melting curve peak.

Experimental Example 1

53.8 L of pure water was charged in a 174 L-volume autoclave; nitrogen replacement was sufficiently carried out; thereafter, 41.7 kg of perfluorocyclobutane, 0.42 kg of perfluoro(propyl vinyl ether) (PPVE) and 1.23 kg of methanol were charged; and the temperature in the system was held at 35° C. and the stirring speed was held at 200 rpm. Then, tetrafluoroethylene (TFE) was introduced under pressure up to 0.5 MPa, and thereafter 0.224 kg of a 50% methanol solution of di-n-propyl peroxydicarbonate was charged to initiate polymerization. Since the pressure in the system decreased along with the progress of the polymerization, TFE was continuously supplied to make the pressure constant, and 0.021 kg of PPVE was added for every 1 kg of TFE supplied and the polymerization was continued for 7 hours. TFE was released to return the pressure in the autoclave to the atmospheric pressure, and thereafter, an obtained reaction product was washed with water and dried to thereby obtain 30 kg of a powder.

The obtained powder was melt extruded at 360° C. by a screw extruder (trade name: PCM46, manufactured by Ikegai Corp) to thereby obtain pellets of a TFE/PPVE copolymer. By using the obtained pellets, various physical properties were measured by the above-mentioned methods.

Experimental Example 2

Pellets were obtained as in Experimental Example 1, except for changing the charged amount of PPVE to 0.53 kg, changing the charged amount of methanol to 0.63 kg, adding 0.027 kg of PPVE for every 1 kg of TFE supplied, and changing the polymerization time to 7.5 hours.

Experimental Example 3

Pellets were obtained as in Experimental Example 1, except for changing the charged amount of PPVE to 0.55 kg, changing the charged amount of methanol to 1.65 kg, adding 0.028 kg of PPVE for every 1 kg of TFE supplied, and changing the polymerization time to 8 hours.

Experimental Example 4

Pellets were obtained as in Experimental Example 1, except for changing the charged amount of pure water to 26.6 L, perfluorocyclobutane to 30.4 kg, PPVE to 0.77 kg and methanol to 2.15 kg, introducing TFE under pressure up to 0.58 MPa, changing the charged amount of the 50% methanol solution of di-n-propyl peroxydicarbonate to 0.011 kg, adding 0.031 kg of PPVE for every 1 kg of TFE supplied, and changing the polymerization time to 9 hours to obtain 15 kg of a powder.

Experimental Example 5

Pellets were obtained as in Experimental Example 1, except for changing the charged amount of pure water to 26.6 L, perfluorocyclobutane to 30.4 kg, PPVE to 0.77 kg and methanol to 3.25 kg, introducing TFE under pressure up to 0.58 MPa, changing the charged amount of the 50% methanol solution of di-n-propyl peroxydicarbonate to 0.011 kg, adding 0.031 kg of PPVE for every 1 kg of TFE supplied, and changing the polymerization time to 10 hours to obtain 15 kg of a powder.

Experimental Example 6

Pellets were obtained as in Experimental Example 1, except for changing the charged amount of pure water to 26.6 L, perfluorocyclobutane to 30.4 kg, PPVE to 0.73 kg and methanol to 6.15 kg, introducing TFE under pressure up to 0.58 MPa, changing the charged amount of the 50% methanol solution of di-n-propyl peroxydicarbonate to 0.011 kg, adding 0.030 kg of PPVE for every 1 kg of TFE supplied, and changing the polymerization time to 10.5 hours to obtain 15 kg of a powder.

Experimental Example 7

Pellets were obtained as in Experimental Example 1, except for changing the charged amount of pure water to 26.6 L, perfluorocyclobutane to 30.4 kg, PPVE to 0.77 kg and methanol to 5.40 kg, introducing TFE under pressure up to 0.58 MPa, changing the charged amount of the 50% methanol solution of di-n-propyl peroxydicarbonate to 0.011 kg, adding 0.031 kg of PPVE for every 1 kg of TFE supplied, and changing the polymerization time to 11 hours to obtain 15 kg of a powder.

Experimental Example 8

Pellets were obtained as in Experimental Example 1, except for changing the charged amount of pure water to 26.6 L, perfluorocyclobutane to 30.4 kg, PPVE to 1.02 kg and methanol to 2.83 kg, introducing TFE under pressure up to 0.58 MPa, changing the charged amount of the 50% methanol solution of di-n-propyl peroxydicarbonate to 0.015 kg, adding 0.038 kg of PPVE for every 1 kg of TFE supplied, and changing the polymerization time to 9 hours to obtain 15 kg of a powder.

Experimental Example 9

Pellets were obtained as in Experimental Example 1, except for changing the charged amount of pure water to 26.6 L, perfluorocyclobutane to 30.4 kg and PPVE to 1.13 kg and adding no methanol, introducing TFE under pressure up to 0.58 MPa, changing the charged amount of the 50% methanol solution of di-n-propyl peroxydicarbonate to 0.044 kg, adding 0.041 kg of PPVE for every 1 kg of TFE supplied, and changing the polymerization time to 8 hours to obtain 15 kg of a powder.

Experimental Example 10

Pellets were obtained as in Experimental Example 1, except for changing the charged amount of pure water to 26.6 L, perfluorocyclobutane to 30.4 kg, PPVE to 0.93 kg and methanol to 4.20 kg, introducing TFE under pressure up to 0.58 MPa, changing the charged amount of the 50% methanol solution of di-n-propyl peroxydicarbonate to 0.021 kg, adding 0.035 kg of PPVE for every 1 kg of TFE supplied, and changing the polymerization time to 8 hours to obtain 15 kg of a powder.

Experimental Example 11

Pellets were obtained as in Experimental Example 1, except for changing the charged amount of pure water to 26.6 L, perfluorocyclobutane to 30.4 kg, PPVE to 1.01 kg and methanol to 4.65 kg, introducing TFE under pressure up to 0.58 MPa, changing the charged amount of the 50% methanol solution of di-n-propyl peroxydicarbonate to 0.015 kg, adding 0.037 kg of PPVE for every 1 kg of TFE supplied, and changing the polymerization time to 10 hours to obtain 15 kg of a powder.

Experimental Example 12

Pellets were obtained as in Experimental Example 1, except for changing the charged amount of pure water to 26.6 L, perfluorocyclobutane to 30.4 kg, PPVE to 1.20 kg and methanol to 2.20 kg, introducing TFE under pressure up to 0.58 MPa, changing the charged amount of the 50% methanol solution of di-n-propyl peroxydicarbonate to 0.022 kg, adding 0.044 kg of PPVE for every 1 kg of TFE supplied, and changing the polymerization time to 7.5 hours to obtain 15 kg of a powder.

Experimental Example 13

Pellets were obtained as in Experimental Example 1, except for changing the charged amount of pure water to 49.0 L, perfluorocyclobutane to 40.7 kg, PPVE to 1.38 kg and methanol to 4.00 kg, introducing TFE under pressure up to 0.64 MPa, changing the charged amount of the 50% methanol solution of di-n-propyl peroxydicarbonate to 0.041 kg, adding 0.047 kg of PPVE for every 1 kg of TFE supplied, and changing the polymerization time to 18 hours.

Experimental Example 14

51.8 L of pure water was charged in a 174 L-volume autoclave; nitrogen replacement was sufficiently carried out; thereafter, 40.9 kg of perfluorocyclobutane, 1.73 kg of perfluoro(propyl vinyl ether) (PPVE) and 1.04 kg of methanol were charged; and the temperature in the system was held at 35° C. and the stirring speed was held at 200 rpm. Then, tetrafluoroethylene (TFE) was introduced under pressure up to 0.64 MPa, and thereafter 0.103 kg of a 50% methanol solution of di-n-propyl peroxydicarbonate was charged to initiate polymerization. Since the pressure in the system decreased along with the progress of the polymerization, TFE was continuously supplied to make the pressure constant, and 0.041 kg of PPVE was added for every 1 kg of TFE supplied. When the additionally charged amount of TFE reached 40.9 kg, the polymerization was finished. Unreacted TFE was released to return the pressure in the autoclave to the atmospheric pressure, and thereafter, an obtained reaction product was washed with water and dried to thereby obtain 42.6 kg of a powder.

The obtained powder was melt extruded at 360° C. by a screw extruder (trade name: PCM46, manufactured by Ikegai Corp.) to thereby obtain pellets of a TFE/PPVE copolymer. By using the obtained pellets, various physical properties were measured by the method described above.

Experimental Example 15

Pellets were obtained as in Experimental Example 1, except for changing the charged amount of pure water to 26.6 L, perfluorocyclobutane to 30.4 kg, PPVE to 0.73 kg and methanol to 5.80 kg, introducing TFE under pressure up to 0.58 MPa, changing the charged amount of the 50% methanol solution of di-n-propyl peroxydicarbonate to 0.011 kg, adding 0.030 kg of PPVE for every 1 kg of TFE supplied, and changing the polymerization time to 10.5 hours to thereby obtain 15 kg of a powder.

The obtained pellets were put in a vacuum vibration-type reactor VVD-30 (manufactured by Okawara MFG. Co., Ltd.), and heated to 210° C. After vacuumizing, $F_2$ gas diluted to 2.0% by volume with $N_2$ gas was introduced to the atmospheric pressure. 0.5 hour after the $F_2$ gas introduction, vacuumizing was once carried out and $F_2$ gas was again introduced. Further, 0.5 hour thereafter, vacuumizing was again carried out and $F_2$ gas was again introduced. Thereafter, while the above operation of the $F_2$ gas introduction and the vacuumizing was carried out once every 1 hour, the reaction was carried out at a temperature of 210° C. for 10 hours. After the reaction was finished, the reactor interior was replaced sufficiently by $N_2$ gas to finish the fluorination reaction. By using the fluorinated pellets, various physical properties were measured by the methods described above.

Comparative Experimental Example 1

Pellets were obtained as in Experimental Example 1, except for changing the charged amount of pure water to 34.0 L, perfluorocyclobutane to 30.4 kg, PPVE to 0.73 kg and methanol to 3.20 kg, introducing TFE under pressure up to 0.60 MPa, changing the charged amount of the 50% methanol solution of di-n-propyl peroxydicarbonate to 0.060 kg, adding 0.040 kg of PPVE for every 1 kg of TFE supplied, and changing the polymerization time to 20 hours.

Comparative Experimental Example 2

Pellets were obtained as in Experimental Example 1, except for changing the charged amount of pure water to 34.0 L, perfluorocyclobutane to 30.4 kg, PPVE to 0.98 kg and methanol to 1.65 kg, introducing TFE under pressure to 0.60 MPa, changing the charged amount of the 50% methanol solution of di-n-propyl peroxydicarbonate to 0.060 kg, adding 0.052 kg of PPVE for every 1 kg of TFE supplied, and changing the polymerization time to 23 hours.

Comparative Experimental Example 3

Pellets were obtained as in Experimental Example 1, except for changing the charged amount of pure water to 34.0 L, perfluorocyclobutane to 30.4 kg, PPVE to 0.84 kg and methanol to 3.50 kg, introducing TFE under pressure up to 0.60 MPa, changing the charged amount of the 50% methanol solution of di-n-propyl peroxydicarbonate to 0.060 kg, adding 0.043 kg of PPVE for every 1 kg of TFE supplied, and changing the polymerization time to 23 hours.

Comparative Experimental Example 4

Pellets were obtained as in Experimental Example 1, except for changing the charged amount of pure water to 26.6 L, perfluorocyclobutane to 30.4 kg, PPVE to 1.12 kg and methanol to 0.10 kg, introducing TFE under pressure to 0.58 MPa, changing the charged amount of the 50% methanol solution of di-n-propyl peroxydicarbonate to 0.010 kg, adding 0.040 kg of PPVE for every 1 kg of TFE supplied, and changing the polymerization time to 5.5 hours to obtain 15 kg of a powder.

Comparative Experimental Example 5

Pellets were obtained as in Experimental Example 1, except for changing the charged amount of PPVE to 0.25 kg and methanol to 2.49 kg, 50% methanol solution of di-n-propyl peroxydicarbonate to 0.149 kg, adding 0.013 kg of PPVE for every 1 kg of TFE supplied.

By using the pellets obtained in the Experimental Examples and Comparative Experimental Examples, various physical properties were measured by the above-mentioned methods. The results are shown in Table 3.

TABLE 3

| | PPVE content (wt %) | MFR (g/10) | Number of functional groups (number/C $10^6$) | Melting point (°C) | Quantity of heat of melting (mJ/mg) |
|---|---|---|---|---|---|
| Experimental Example 1 | 2.1 | 17.5 | 254 | 314 | 37.2 |
| Experimental Example 2 | 2.6 | 10.8 | 211 | 310 | 30.8 |
| Experimental Example 3 | 2.7 | 26.0 | 289 | 310 | 35.0 |
| Experimental Example 4 | 3.0 | 10.8 | 211 | 310 | 29.5 |
| Experimental Example 5 | 3.0 | 15.2 | 241 | 310 | 32.3 |
| Experimental Example 6 | 2.9 | 33.5 | 311 | 310 | 35.0 |
| Experimental Example 7 | 3.0 | 28.4 | 297 | 310 | 34.8 |
| Experimental Example 8 | 3.6 | 14.0 | 234 | 307 | 29.8 |
| Experimental Example 9 | 3.9 | 7.1 | 174 | 305 | 25.5 |
| Experimental Example 10 | 3.4 | 26.0 | 289 | 309 | 33.5 |
| Experimental Example 11 | 3.6 | 24.0 | 282 | 307 | 32.8 |
| Experimental Example 12 | 4.2 | 15.8 | 245 | 304 | 28.4 |
| Experimental Example 13 | 4.5 | 26.0 | 289 | 304 | 29.6 |
| Experimental Example 14 | 3.9 | 15.5 | 243 | 305 | 29.5 |
| Experimental Example 15 | 2.9 | 33.5 | <6 | 310 | 35.0 |
| Comparative Experimental Example 1 | 3.9 | 40.0 | 327 | 305 | 33.6 |
| Comparative Experimental Example 2 | 4.9 | 30.4 | 303 | 302 | 27.8 |
| Comparative Experimental Example 3 | 4.2 | 46.0 | 339 | 304 | 33.0 |

TABLE 3-continued

| | PPVE content (wt %) | MFR (g/10) | Number of functional groups (number/C $10^6$) | Melting point (°C) | Quantity of heat of melting (mJ/mg) |
|---|---|---|---|---|---|
| Comparative Experimental Example 4 | 3.9 | 2.0 | 91 | 305 | 23.0 |
| Comparative Experimental Example 5 | 1.3 | 19.0 | 261 | 319 | 37.9 |

The description of "<6" in Table 3 means that the number of functional groups is less than 6.

Then, by using the obtained pellets, the following properties were evaluated. The results are shown in Table 4.

(Compression Set Rate (CS))

The measurement of the compression set rate was carried out according to the method described in ASTM D395 or JIS K6262.

Approximately 2 g of the pellets was charged in a metal mold (inner diameter: 13 mm, height: 38 mm), and melted by hot plate press at 370° C. for 30 min, thereafter, water-cooled with a pressure of 0.2 MPa (resin pressure) to thereby prepare a molded article of approximately 8 mm in height. Thereafter, by cutting the obtained molded article, a test piece of 13 mm in outer diameter and 6 mm in height was prepared. The prepared test piece was compressed to a compression deformation rate of 50% (that is, the test piece of 6 mm in height was compressed to a height of 3 mm) at normal temperature by using a compression device.

Then, the compressed test piece being fixed on the compression device was allowed to stand still in an electric furnace at 65° C. for 72 hours. The compression device was taken out from the electric furnace, and cooled to room temperature; thereafter, the test piece was dismounted. The collected test piece was allowed to stand at room temperature for 30 min; thereafter, the height of the collected test piece was measured and the compression set rate was determined by the following formula.

$$\text{Compression set rate (\%)}=(t_0-t_2)/(t_0-t_1)\times 100$$

$t_0$: an original height of the test piece (mm)

$t_1$: a height of a spacer (mm)

$t_2$: a height of the test piece dismounted from the compression device (mm)

In the above test, to was 6 mm and $t_1$ was 3 mm.

(Compression Set Test)

Test pieces were prepared as mentioned in the measurement of the compression set rate. The prepared test piece was compressed to a compression deformation rate of 50% (that is, the test piece of 6 mm in height was compressed to a height of 3 mm) at a normal temperature by using a compression device. The compressed test piece fixed on the compression device was allowed to stand still in an electric furnace at 150° C. for 18 hours. The compression device was taken out from the electric furnace, and cooled to room temperature; thereafter, the test piece was dismounted. The collected test piece was allowed to stand at room temperature for 30 min; thereafter, the collected test piece was observed and evaluated based on the following criteria.

Absent: no cracks were observed on the test piece.

Present: cracks were observed on the test piece.

The height of the collected test piece was measured and the amount of recovery was determined by the following formula.

$$\text{Amount of recovery (mm)}=t_2-t_1$$

$t_1$: a height of a spacer (mm)

$t_2$: a height of the test piece dismounted from the compression device (mm)

In the above test, $t_1$ was 3 mm.

(Storage Elastic Modulus at 150° C. (E'))

The storage elastic modulus was determined by carrying out dynamic viscoelasticity measurement using a DVA-220 (manufactured by IT Keisoku Seigyo K.K.). A heat press sheet of 25 mm in length, 5 mm in width and 0.2 mm in thickness was used as a sample test piece, the measurement was carried out under the condition of a temperature-increasing rate of 2° C./min, a frequency of 10 Hz, and in the range of 30° C. to 250° C., and the storage elastic modulus (MPa) at 150° C. was identified.

(Surface Pressure at 150° C.)

The surface pressure at 150° C. was determined from the result of the compression set test at 150° C. and the result of the storage elastic modulus measurement at 150° C. by the following formula.

$$\text{Surface pressure at 150° C. (MPa)}: (t_2-t_1)/t_1\times E'$$

$t_1$: the height of the spacer $t_2$: the height of the test piece dismounted from the compression device E': the storage elastic modulus at 150° C. (MPa)

(Water Vapor Permeability)

By using the pellets and a heat press molding machine, a sheet-shape test piece of approximately 0.2 mm in thickness was prepared. 18 g of water was put in a test cup (permeation area: 12.56 $cm^2$), and the test cup was covered with the sheet-shape test piece; and a PTFE gasket was pinched and fastened to hermetically close the test cup. The sheet-shape test piece was brought into contact with the water, and held at a temperature of 95° C. for 30 days, and thereafter, the test cup was taken out and allowed to stand at room temperature for 2 hours; thereafter, the amount of the mass lost was measured. The water vapor permeability (g·cm/$m^2$) was determined by the following formula.

$$\text{Water vapor permeability (g·cm/m}^2\text{)=the amount of the mass lost (g)}\times\text{the thickness of the sheet-shape test piece (cm)/the permeation area (m}^2\text{)}$$

(Water Vapor Leak Test)

The copolymer was injection molded by using an injection molding machine (manufactured by Sumitomo Heavy Industries, Ltd., SE50EV-A) at a cylinder temperature of 350 to 385° C. and at a metal mold temperature of 150 to 200° C. to thereby obtain a gasket of ϕ17.7 mm in outer diameter, ϕ14.3 mm in inner diameter and 1.6 mmt in thickness.

Since injection molding of the copolymers of Comparative Experimental Example 4 was difficult and gaskets could not be prepared by injection molding these copolymers, gaskets were prepared by the following method. Pellets of the copolymer was charged in a metal mold (300 mm×300 mm) and preheated in an electric furnace at 350° C. for 1 hour, and thereafter pressurized at 1 MPa for 1 min to prepare a sheet of 300 mm×300 mm and 25 mm in thickness, which was then allowed to cool to room temperature to thereby obtain a sample sheet (in Table 4, described as "HP" (heat press)). The sample sheet was cut into ϕ17.7 mm in outer diameter, ϕ14.3 mm in inner diameter and 1.6 mmt in thickness to thereby obtain a gasket.

Figure 5:
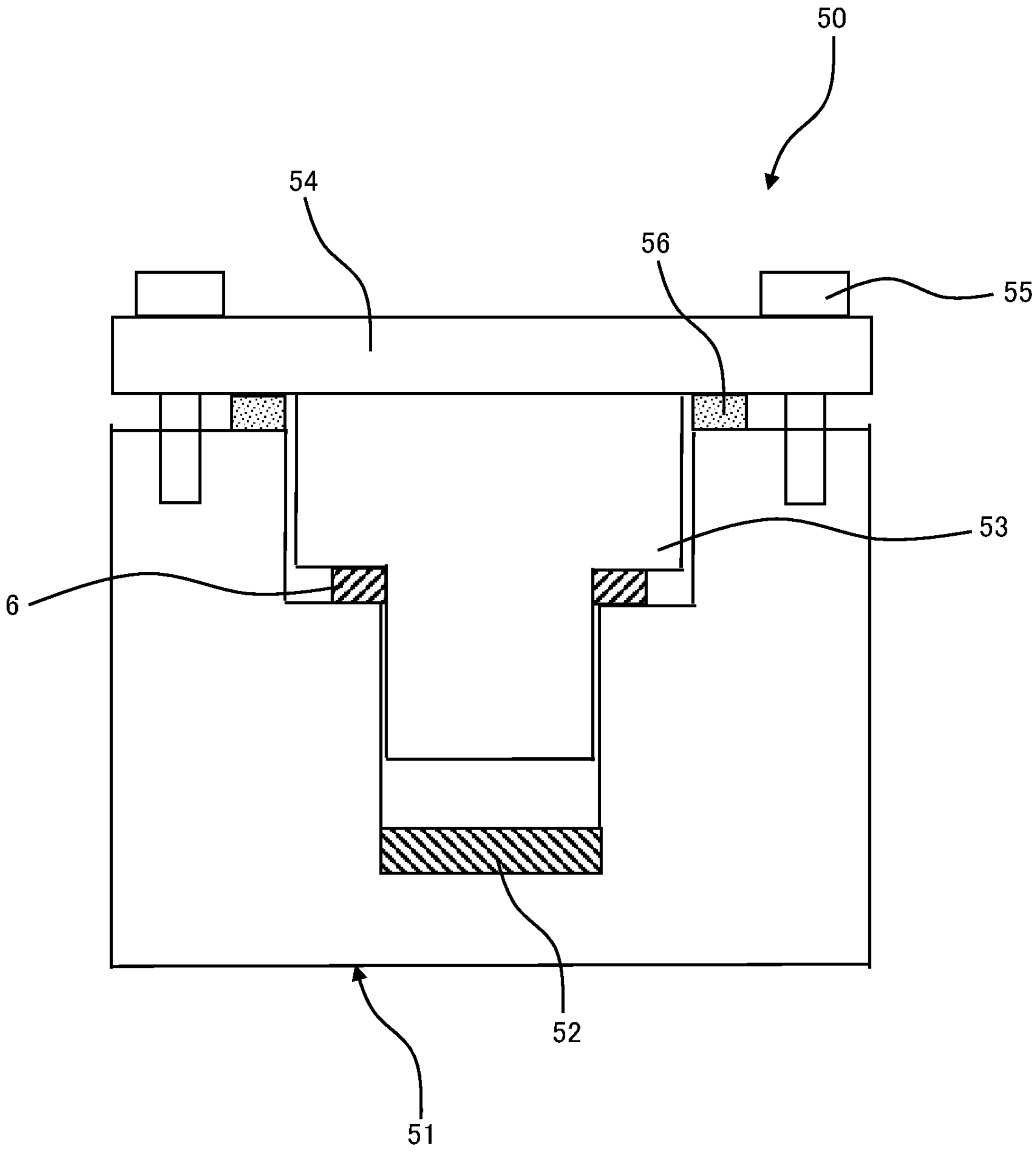
FIG. 5 is a schematic cross-sectional view of a test jig to be used for a water vapor leak test.

As illustrated in FIG. 5, 2 g of water 52 was put in an aluminum alloy cup 51. A gasket 6 was assembled between the cup 51 and a gasket compression jig 53; the lid 54 was fastened with bolts 55 to compress the gasket 6. A spacer 56 was disposed between the lid 54 and the cup 51 and the compression deformation rate of the gasket 6 was adjusted to 50%. The mass of a test jig 50 thus obtained was measured. The test jig 50 was charged in a thermostatic chamber heated at 95° C., and after 1,000 hours of being allowed to stand therein, taken out and allowed to stand at room temperature for 2 hours; thereafter, the mass was measured. The amount of the water vapor leak was determined by the following formula. This operation was five times repeated and the average value of the amounts of the water vapor leak was determined. In Table 4, the average values are described.

Amount of the water vapor leak (g/1,000 h)=(a mass of the test jig before being heated)−(a mass of the test jig after being heated)

(Carbon Dioxide Permeability Coefficient)

By using the pellets and a heat press molding machine, a sheet-shape test piece of approximately 0.1 mm in thickness was prepared. By using the obtained test piece, the measurement of the carbon dioxide transmission rate was carried out according to JIS K7126-1:2006 by using a differential-pressure type gas permeation analyzer (1100-5000 type, manufactured by Systech illinois Ltd.). A numerical value of the carbon dioxide transmission rate with a permeation area of 50.24 $cm^2$ at a test temperature of 70° C. and at a test humidity of 0% RH was obtained. By using the obtained carbon dioxide transmission rate and the thickness of the test piece, the carbon dioxide permeability coefficient was calculated by the following formula.

$$\text{Carbon dioxide permeability coefficient } (cm^3 \cdot mm/(m^2 \cdot h \cdot atm)) = GTR \times d$$

GTR: the carbon dioxide transmission rate ($cm^3/(m^2 \cdot h \cdot atm)$)

d: the thickness of the test piece (mm)

In Table 4, the description of "crack" means that the test piece was inferior in the crack resistance to a compression stress and a crack(s) was generated in the test piece during the test.

(Injection Moldability)

The copolymer was injection molded by using an injection molding machine (SE50EV-A, manufactured by Sumitomo Heavy Industries, Ltd.) set at a cylinder temperature of 395° C., a metal mold temperature of 220° C. and an injection speed of 3 mm/s. The metal mold used was a metal mold (100 mm×100 mm×3 mmt, film gate, flow length from the gate: 100 mm) Cr plated on HPM38.

The obtained injection molded article was observed and evaluated according to the following criteria. The presence/absence of white turbidness was visually checked.

The presence/absence of roughness of the surface was checked by touching the surface of the injection molded article.

3: The whole of the injection molded article was transparent and the whole surface was smooth.

2: White turbidness was observed within the region of 1 cm from the portion where the gate of the metal mold had been positioned, and the whole surface was smooth.

1: White turbidness was observed within the region of 1 cm from the portion where the gate of the metal mold had been positioned, and roughness was observed on the surface within the region of 1 cm of the portion where the gate of the metal mold had been positioned.

0: The copolymer was not filled in the whole of the metal mold and the molded article having a desired shape was not obtained.

TABLE 4

| | Compression set rate 65 °C (%) | Compression set test 150 °C | Amount of recovery (mm) | E' 150 °C (MPa) | Surface pressure 150 °C (MPa) | Water vapor permeability (g · cm/$m^2$) | Water vapor leak test: Gasket preparing method | Water vapor leak test: Leaking amount of water vapor (g/1,000 hrs) | $CO^2$ permeability coefficient Cm3 · mm/(m2 · h · atm) | Injection moldability |
|---|---|---|---|---|---|---|---|---|---|---|
| Experimental Example 1 | 83 | Absent | 0.037 | 160 | 2.0 | 6.8 | Injection moldinig | 0.0027 | 54 | 3 |
| Experimental Example 2 | 81 | Absent | 0.037 | 147 | 1.8 | 8.0 | Injection moldinig | 0.0024 | 60 | 3 |
| Experimental Example 3 | 83 | Absent | 0.029 | 156 | 1.5 | 6.7 | Injection moldinig | 0.0026 | 54 | 3 |
| Experimental Example 4 | 82 | Absent | 0.035 | 128 | 1.5 | 8.7 | Injection moldinig | 0.0024 | 64 | 3 |
| Experimental Example 5 | 83 | Absent | 0.032 | 133 | 1.4 | 8.0 | Injection moldinig | 0.0025 | 61 | 3 |
| Experimental Example 6 | 85 | Absent | 0.023 | 153 | 1.2 | 6.5 | Injection moldinig | 0.0028 | 54 | 3 |
| Experimental Example 7 | 85 | Absent | 0.023 | 143 | 1.1 | 7.0 | Injection moldinig | 0.0028 | 56 | 3 |
| Experimental Example 8 | 83 | Absent | 0.025 | 125 | 1.0 | 9.3 | Injection moldinig | 0.0026 | 65 | 3 |
| Experimental Example 9 | 79 | Absent | 0.031 | 100 | 1.0 | 10.7 | Injection moldinig | 0.0025 | 73 | 2 |
| Experimental Example 10 | 85 | Absent | 0.023 | 134 | 1.0 | 7.8 | Injection moldinig | 0.0028 | 59 | 3 |
| Experimental Example 11 | 85 | Absent | 0.023 | 128 | 1.0 | 8.1 | Injection moldinig | 0.0028 | 61 | 3 |

TABLE 4-continued

| | Compression set rate 65 °C (%) | Compression set test 150 °C | Amount of recovery (mm) | E' 150 °C (MPa) | Surface pressure 150 °C (MPa) | Water vapor permeability (g · cm/m$^2$) | Water vapor leak test: Gasket preparing method | Water vapor leak test: Leaking amount of water vapor (g/ 1,000 hrs) | $CO^2$ permeability coefficient Cm3 · mm/ (m2 · h · atm) | Injection moldability |
|---|---|---|---|---|---|---|---|---|---|---|
| Experimental Example 12 | 83 | Absent | 0.023 | 110 | 0.8 | 9.8 | Injection moldinig | 0.0028 | 68 | 3 |
| Experimental Example 13 | 86 | Absent | 0.022 | 108 | 0.5 | 9.4 | Injection moldinig | 0.0031 | 66 | 3 |
| Experimental Example 14 | 83 | Absent | 0.013 | 115 | 1.0 | 9.3 | Injection moldinig | 0.0027 | 66 | 3 |
| Experimental Example 15 | 84 | Absent | 0.025 | 153 | 1.3 | 6.5 | Injection moldinig | 0.0028 | 45 | 3 |
| Comparative Experimental Example 1 | 86 | Absent | 0.011 | 127 | 0.5 | 7.5 | Injection moldinig | 0.0033 | 59 | 3 |
| Comparative Experimental Example 2 | 85 | Absent | 0.009 | 95 | 0.3 | 10.2 | Injection moldinig | 0.0032 | 68 | 3 |
| Comparative Experimental Example 3 | 87 | Absent | 0.004 | 128 | 0.2 | 7.5 | Injection moldinig | 0.0036 | 59 | 3 |
| Comparative Experimental Example 4 | 77 | Absent | 0.032 | 82 | 0.9 | 14.0 | HP & cutting | 0.0020 | 83 | 0 |
| Comparative Experimental Example 5 | crack | Present | — | — | — | (*1) | Injection molding | (*1) | crack | — |

(*Since a crack(s) was generated during the test, the test was discontinued on the way.

REFERENCE SIGNS LIST

10 POWER STORAGE ASSEMBLY
1 EXTERIOR CAN
2 LID
3 BOTTOM FACE
4A FIRST EXTERNAL TERMINAL
4B SECOND EXTERNAL TERMINAL
5 PLUG
6 GASKET
61 CYLINDRICAL PART
62 FLANGE PART
63 SIDE WALL PART
7 INSULATING MEMBER
50 TEST JIG

What is claimed is:

1. A power storage assembly comprising a gasket containing a copolymer consisting of tetrafluoroethylene unit, a perfluoro(propyl vinyl ether) unit, and an optional unit derived from a molecule copolymerizable with the tetrafluoroethylene and the perfluoro(propyl vinyl ether), wherein the copolymer has a content of the perfluoro(propyl vinyl ether) unit of 2.0 to 4.5% by mass with respect to the whole of the monomer units, a content of the tetrafluoroethylene unit of 95.5 to 98.0% by mass with respect to the whole of the monomer units, a content of the optional unit of 0 to 0.5% by mass with respect to the whole of the monomer units, a melt flow rate of 10.8 to 36 g/10 min at 372° C. and a load of 5 kg, and a total number of functional groups of —CF=CF$_2$, —CF$_2$H, —COF, —COOH, —COOCH$_3$, —CONH$_2$ and —CH$_2$OH is more than 50 and 800 or less per $10^6$ main-chain carbon atoms, wherein the gasket has a thickness of 0.5 to 2.5 mm and a sealing area of 0.5 to 50 cm$^2$.

2. The power storage assembly according to claim 1, wherein the gasket is in a state of being compressed at a compression deformation rate of 20 to 60%.

3. The power storage assembly according to claim 1, wherein the copolymer has a melting point of 301 to 317° C.

4. The power storage assembly according to claim 1, wherein the copolymer has a quantity of heat of melting of 24.0 mJ/mg or higher.

5. The power storage assembly according to claim 1, wherein the copolymer has a fluorine content of lower than 70% by mol.

6. The power storage assembly according to claim 1, wherein the gasket is an injection molded article or a transfer molded article.

7. The power storage assembly according to claim 1, the power storage assembly comprising:

an exterior can;
an electric element housed in the exterior can;
a lid to close an opening of the exterior can; and
an external terminal installed on the lid,
wherein the gasket is held between the lid and the external terminal.

* * * * *